United States Patent
Elsishans et al.

(10) Patent No.: US 11,036,569 B2
(45) Date of Patent: Jun. 15, 2021

(54) STACK SAFETY FOR INDEPENDENTLY DEFINED OPERATIONS

(71) Applicant: Lutron Technology Company LLC, Coopersburg, PA (US)

(72) Inventors: Nathan B. Elsishans, Hellertown, PA (US); Francois Carouge, Coopersburg, PA (US)

(73) Assignee: Lutron Technology Company LLC

( * ) Notice: Subject to any disclaimer, the term of this patent is extended or adjusted under 35 U.S.C. 154(b) by 140 days.

(21) Appl. No.: 16/112,328

(22) Filed: Aug. 24, 2018

(65) Prior Publication Data

US 2019/0065293 A1 Feb. 28, 2019

Related U.S. Application Data

(60) Provisional application No. 62/549,637, filed on Aug. 24, 2017.

(51) Int. Cl.
*G06F 9/54* (2006.01)
*G06F 9/50* (2006.01)
*G06F 9/46* (2006.01)

(52) U.S. Cl.
CPC .............. *G06F 9/547* (2013.01); *G06F 9/461* (2013.01); *G06F 9/5016* (2013.01); *G06F 9/544* (2013.01)

(58) Field of Classification Search
None
See application file for complete search history.

(56) References Cited

U.S. PATENT DOCUMENTS

| 6,141,697 A * | 10/2000 | Hale ........................ G06F 9/547 719/312 |
| 2003/0225973 A1* | 12/2003 | Garber .................. G06F 12/023 711/132 |
| 2006/0070044 A1* | 3/2006 | Romanovski ......... G06F 9/5016 717/136 |
| 2006/0195824 A1* | 8/2006 | Iwamoto ............... G06F 9/4484 717/133 |
| 2006/0265687 A1* | 11/2006 | Lin ........................ G06F 9/4486 717/101 |
| 2012/0066482 A1* | 3/2012 | Gonion .................... G06F 8/441 712/226 |
| 2015/0220323 A1* | 8/2015 | Ikawa ........................ G06F 8/65 717/168 |
| 2017/0109146 A1* | 4/2017 | Ireland .................... H01L 24/81 |
| 2017/0131932 A1* | 5/2017 | Fu .......................... G06F 3/0604 |
| 2018/0004690 A1* | 1/2018 | Kaminski ........... G06F 13/1663 |
| 2020/0272520 A1* | 8/2020 | Senior ................... G06F 9/5016 |

FOREIGN PATENT DOCUMENTS

| EP | 1696318 A1 | 8/2006 |
| WO | WO2015065500 A1 | 5/2015 |

* cited by examiner

*Primary Examiner* — Charles E Anya
(74) *Attorney, Agent, or Firm* — Glen Farbanish; Philip Smith; Michael Czarnecki

(57) ABSTRACT

Systems and methods are disclosed for swapping or changing between stacks associated with respective applications when one application calls the other.

38 Claims, 19 Drawing Sheets

```
int boot-function-n(int argc, char * argv[])
         401                              403
{
    extern UINT_PTR preserveContext(void);
    extern void restoreContext(UINT_PTR);

int error = CMD_PARAM_ERROR;
    UINT_PTR stackPointer = 0;    405

// Change stack register to use the boot stack rather than the OS stack.
    stackPointer = preserveContext();    404 error = Boot-Function-N(argc, argv);    402

// Change stack register back to the OS stack.
    restoreContext(stackPointer);
                        407
    return error;
       406
}
```

Figure 4

```
/**
 * If the boot stack is already being used, this function does not modify the stack pointer.
 * Returns the previous stack pointer.
 */
preserveContext:
    // Compare the end of the boot RAM to the current stack pointer.
    move.l %sp, %d0
    move.l #END-OF-Boot-RAM, %d1
    cmp.l %d0, %d1
    bgt returnStackPointer // Stack pointer is outside of the boot RAM so swap it to the boot's stack
    move.l #End-of-Boot-RAM, %d1
    addi.l #Maximum-Boot-Stack-Size, %d1
    move.l %d1, %sp // Copy the four stack variables before the return address since they could
    // be used to store scratch register values.
    move.l %d0, %a0
    move.l 16(%a0), -(%sp)
    move.l 12(%a0), -(%sp)
    move.l 8(%a0), -(%sp)
    move.l 4(%a0), -(%sp)

// Push return address to the top of the stack.
    move.l (%a0), -(%sp)

returnStackPointer:
    rts
```

Figure 9

```
/**
 * Sets the stack pointer to the provided address.
 * If the provided stack pointer was contained within the boot, this function does nothing.
 * parameter: previousStackPointer ... The address to set the new stack pointer to.
 */
restoreContext:
    // Copy previous stack pointer
    move.l 4(%sp), %d0

// Check for a null pointer.
    tst.l %d0
    beq return

// Check if previous stack pointer was in the boot.
    move.l #End-of-Boot-RAM, %d1
    cmp.l %d0, %d1
    bgt return // Prevoius stack pointer was outside of boot so swap it back.
    move.l %sp, %a0
    move.l %d0, %sp // Copy the five stack variables located before the return address
    // These variables include the function parameter and scratch register values.
    move.l 20(%a0), -(%sp)
    move.l 16(%a0), -(%sp)
    move.l 12(%a0), -(%sp)
    move.l 8(%a0), -(%sp)
    move.l 4(%a0), -(%sp)

// Push the return address onto stack.
    move.l (%a0), -(%sp)

return:
    rts
```

Figure 10

STACK SAFETY FOR INDEPENDENTLY DEFINED OPERATIONS

CROSS-REFERENCE TO RELATED APPLICATIONS

This application claims the benefit of U.S. Provisional Patent Application No. 62/549,637, filed Aug. 24, 2017, the entire disclosure of which is incorporated by reference herein.

BACKGROUND

When a computing device executes an application that makes function calls, the computing device may use a stack to store, for example, register values, function parameter values, return addresses, and local variables as the function calls are made.

SUMMARY

According to one example, an apparatus may include at least one processor, and may further include at least one tangible memory module communicatively coupled to the at least one processor. The at least one tangible memory module may have has stored thereon software instructions of a first application and software instructions of a second application, wherein the second application may include a first function and a second function, and wherein the first application may have a first stack associated therewith and the second application may have a second stack associated therewith. The software instructions of the first application and the second application, when executed by the at least processor, may direct the at least one processor to execute the first application, wherein in executing the first application a stack pointer register may point to the first stack. The software instructions, when executed by the at least processor, may further direct the at least processor to, in executing the first application, call the first function of the second application, wherein to call the first function may include to push data values onto the first stack, and wherein the stack pointer register may point to the first stack subsequent to pushing the data values onto the first stack. The software instructions, when executed by the at least processor, may further direct the at least processor to execute the first function, wherein executing the first function may include to determine whether the stack pointer register is pointing to the first stack or is pointing to the second stack. Based at least in part on determining that the stack pointer register is pointing to the first stack, the software instructions, when executed by the at least processor, may further direct the at least processor to change the stack pointer register to point from the first stack to the second stack. The software instructions, when executed by the at least processor, may further direct the at least processor to call the second function from the first function, execute the second function using the second stack, at completion of the second function, change the stack pointer register to point from the second stack to the first stack, return to the first application, and continue to execute the first application using the first stack.

According to another example, an apparatus may include at least one processor, and may further include at least one tangible memory module communicatively coupled to the at least one processor. The at least one tangible memory module may have stored thereon software instructions of a first application and software instructions of a second application. The software instructions, when executed by the at least processor, may direct the at least one processor to execute the first application, and in executing the first application, call a first function of the second application, wherein to call the first function may include to push data values onto a first stack, and wherein a stack pointer register may point to the first stack subsequent to pushing the data values. The software instructions, when executed by the at least processor, may further direct the at least processor to change the stack pointer register to point from the first stack to a second stack in executing the first function. The software instructions, when executed by the at least processor, may further direct the at least processor to copy to the second stack from the first stack first data values located on the first stack, call a second function of the second application, and execute the second function using the second stack. At completion of the second function, the software instructions, when executed by the at least processor, may further direct the at least processor to change the stack pointer register to point from the second stack to the first stack. The software instructions, when executed by the at least processor, may further direct the at least processor to copy to the first stack from the second stack second data values located on the second stack, return to the first application, and continue to execute the first application using the first stack.

The above advantages and features are of representative embodiments only. They are not to be considered limitations. Additional features and advantages of embodiments will become apparent in the following description, from the drawings, and from the claims.

BRIEF DESCRIPTION OF THE DRAWINGS

FIG. 4 illustrates an example code sequence that includes swapping or changing from a first stack to a second stack before a function is executed, executing the function using the second stack, and then swapping back from the second stack to the first stack once the function is completed.

FIG. 9 illustrates an example code sequence of swapping or changing from a first stack to a second stack that may be performed prior to a function being executed.

FIG. 10 illustrates an example code sequence of swapping or changing back from a second stack to a first stack that may be performed after a function is executed

DETAILED DESCRIPTION

Figure 1:
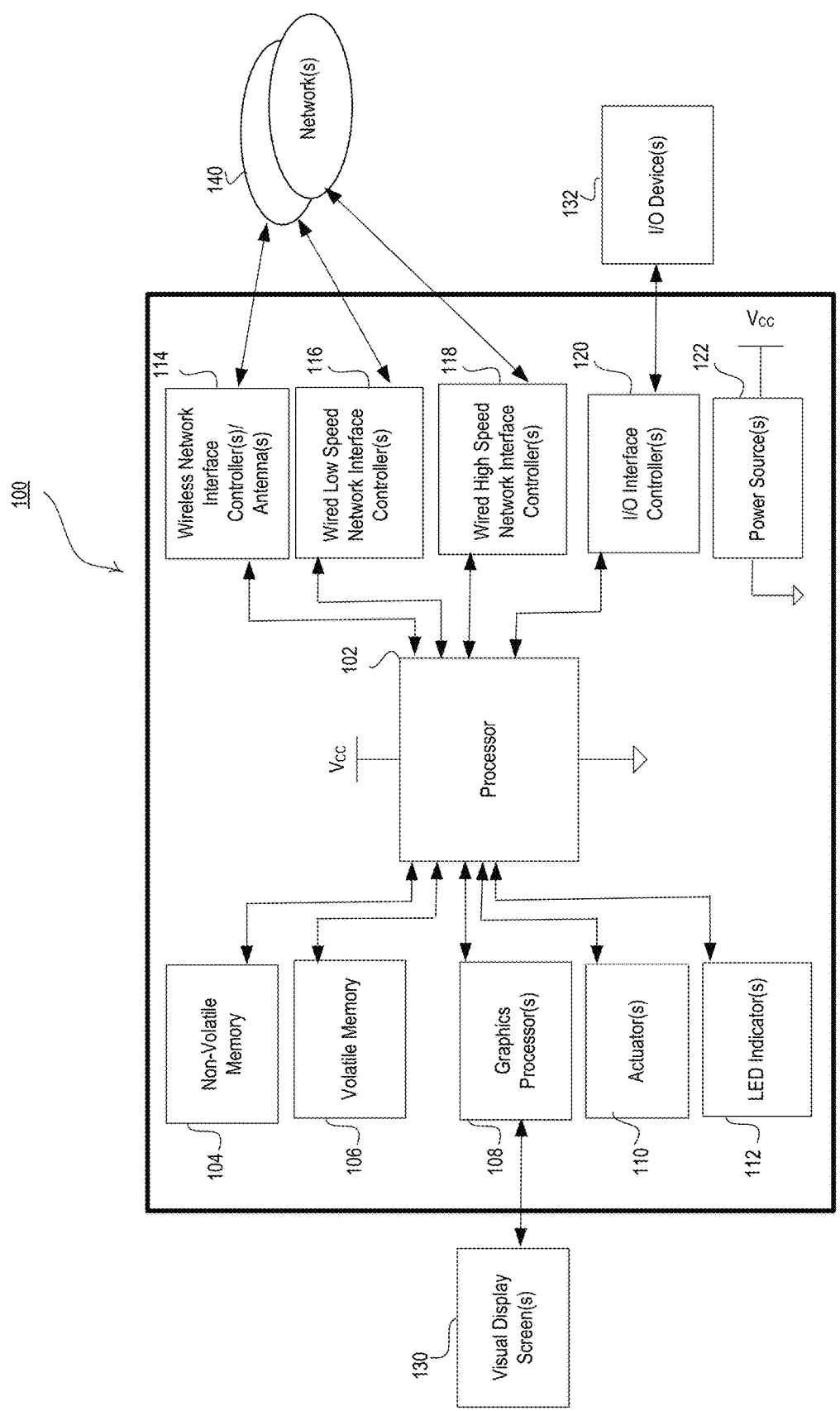
FIG. 1 illustrates an example computing device.

Referring to FIG. 1 there is shown an example computing device (also referred to herein as a device and/or computing system, and/or system, for example) 100. Computing device 100 may include one or more processors 102 (referred to herein as a processor for description purposes only). Processor 102 may be based on the MCF5275 instruction set architecture, although other instruction set architectures are possible and the processes and systems discussed herein are not limited to the MCF5275 architecture. The MCF5275 instruction set architecture will be used herein for description purposes only. As one example, processor 102 may be a ColdFire 5275 microprocessor, although other processors may be used. Processor 102 may control the functionality of computing device 100 through the execution of one or more instructions of one or more software and/or firmware based applications as further described herein. Processor 102 may include one or more registers such as an instruction pointer register (also referred to herein as an instruction pointer), a stack pointer register (also referred to herein as a stack pointer), a stack frame pointer register (also referred to herein as a stack frame pointer), one or more scratch registers, etc. For discussion purposes, examples herein will assume processor 102 has four scratch registers. Computing device 100 may also include a non-volatile memory 104 and a volatile memory 106 that may be communicatively coupled to the processor 102. Non-volatile memory 104 may be memory that can be erased and reprogrammed. As an example, non-volatile memory 104 may include one or more memory devices such as a solid-state drive (SSD), such as solid-state flash memory, erasable programmable read-only memory (EPROM), electrically erasable programmable read-only memory (EEPROM), a hard drive, an optical drive, etc., although other types of non-volatile memory devices may be used. Non-volatile memory 104 may be non-removable memory and/or removable memory, such as a memory stick/USB drive, a memory card, or any other type of removable memory. As further described herein, non-volatile memory 104 may be used to permanently store one or more software based applications (where permanent may mean, for example, that the applications remain in the memory between power cycles and/or resets of computing device 100). Volatile memory 106 may be one or more memory devices and may include, for example, random access memory (RAM) and may be of the form of one or more integrated circuits. Memory 106 may be used by the processor 102 for the execution of software based applications stored in non-volatile memory 104. One will recognize that computing device 100 may include other and/or additional types of memory devices including read-only memory (ROM), and memory that is internal to/part of processor 102.

Computing device 100 may also include one or more network interface controllers/circuits for communicating (transmitting and/or receiving) over one or more wired and/or wireless communication networks and/or channels 140. For example, computing device 100 may include one or more wireless network interface controller(s) and antenna(s) 114 (and corresponding drivers, for example) that enable computing device 100 to wirelessly communicate over one or more wireless communication networks/channels (e.g., BLUETOOTH®, near field communication (NFC), Wi-Fi®, Wi-MAX®, cellular, Wi-Fi Direct, a proprietary communication channel, such as CLEAR CONNECT™, LiFe, infrared, etc.). Computing device 100 may include one or more wired, low-speed network interface controller(s) 116 (and corresponding drivers, for example) that enable computing device 100 to communicate over one or more low-speed communication networks/channels (e.g., RS232, etc.). Computing device 100 may include one or more wired, high-speed network interface controller(s) 118 (and corresponding drivers, for example) that enable computing device 100 to communicate over one or more high-speed communication networks/channels (e.g., Ethernet, optical, etc.). Network interface controllers 114, 116, and 118 may be in communication with processor 102 for enabling software based application(s), for example, executing on computing device 100 to transmit and/or receive information with other computing devices over a network(s) 140.

Computing device 100 may also include one or more input/output (I/O) interface controller(s) 120 (and corresponding drivers, for example) that may be communicatively coupled to the processor 102. The I/O interface controller(s) 120 may allow one or more I/O device(s) 132 to be interfaced with computing device 100. Example I/O devices 132 may include, for example, one or more of a keyboard, a touch sensitive pad, a mouse, a trackball, an audio speaker, and/or audio receiver, etc. Computing device 100 may also include one or more graphics processor(s) 108 (and corresponding drivers, for example) that that may be communicatively coupled to the processor 102. The graphics processor(s) 108 may allow one or more visual display screen(s) 130 to be interfaced with the computing device 100. I/O interface controller(s) 120, I/O device(s) 132, graphics processor(s) 108, and visual display screen(s) 130 may allow a user to interact with the software based application(s), for example, executing on computing device 100, for example.

Computing device 100 may also include one or more actuator(s) 110 (e.g., a button(s), switch(s), etc.) that that may be communicatively coupled to the processor 102. Actuator(s) 110 may allow a user to interact with the software based application(s), for example, executing on computing device 100, to control computing device 100 such as through a reset, etc. Computing device 100 may also include one or more LED indicator(s) 112, for example, that may be communicatively coupled to the processor 102. LED indicator(s) 112 may also allow a user to interact with software based application(s), for example, executing on computing device 100. Processor(s) 102, non-volatile memory 104, volatile memory 106, network interface controllers 114, 116, and 118, I/O interface controller(s) 120, graphics processor(s) 108, actuator(s) 110, and LED indicator(s) 112 may be referred to herein individually and/or collectively as modules and or computing modules. The modules of computing device 100 may be powered by one or more power sources 122. The power source(s) 122 may include an AC power supply(s) and/or DC power supply(s), for example. The power source(s) 122 may generate a supply voltage(s) Vcc, for example, for powering the modules of computing device 100.

One will recognize that computing device 100 may not include each of the noted modules and/or may include additional and/or other modules. According to one example, computing device 100 may be an embedded device or system and may be configured to provide one or more dedicated functions through the execution of one or more software based applications, for example. According to a further example, processor 102 of computing device 100 may not include a memory management unit. Nonetheless, the processes and systems disclosed herein are also applicable to devices that include a memory management unit. According to a specific example, one or more devices within a load control system (such as Lutron's Quantum® and/or Vive® lighting control and energy management systems) may be configured at least in part like computing device 100 and to operate as described herein. Such load control systems may include, for example, a lighting control system used to control the lighting loads in an environment, a motorized window treatment control system used to control the natural light provided to the environment, and a heating, ventilating, and air conditioning (HVAC) system used to control the temperature in the user environment. As an example, Lutron Palladiom Thermostats, Lutron Quantum Processors, and/or Lutron ESN-EcoSystem modules may be configured at least in part to operate like computing device 100 as described herein. Again, these are examples and other examples are possible.

Figure 2:
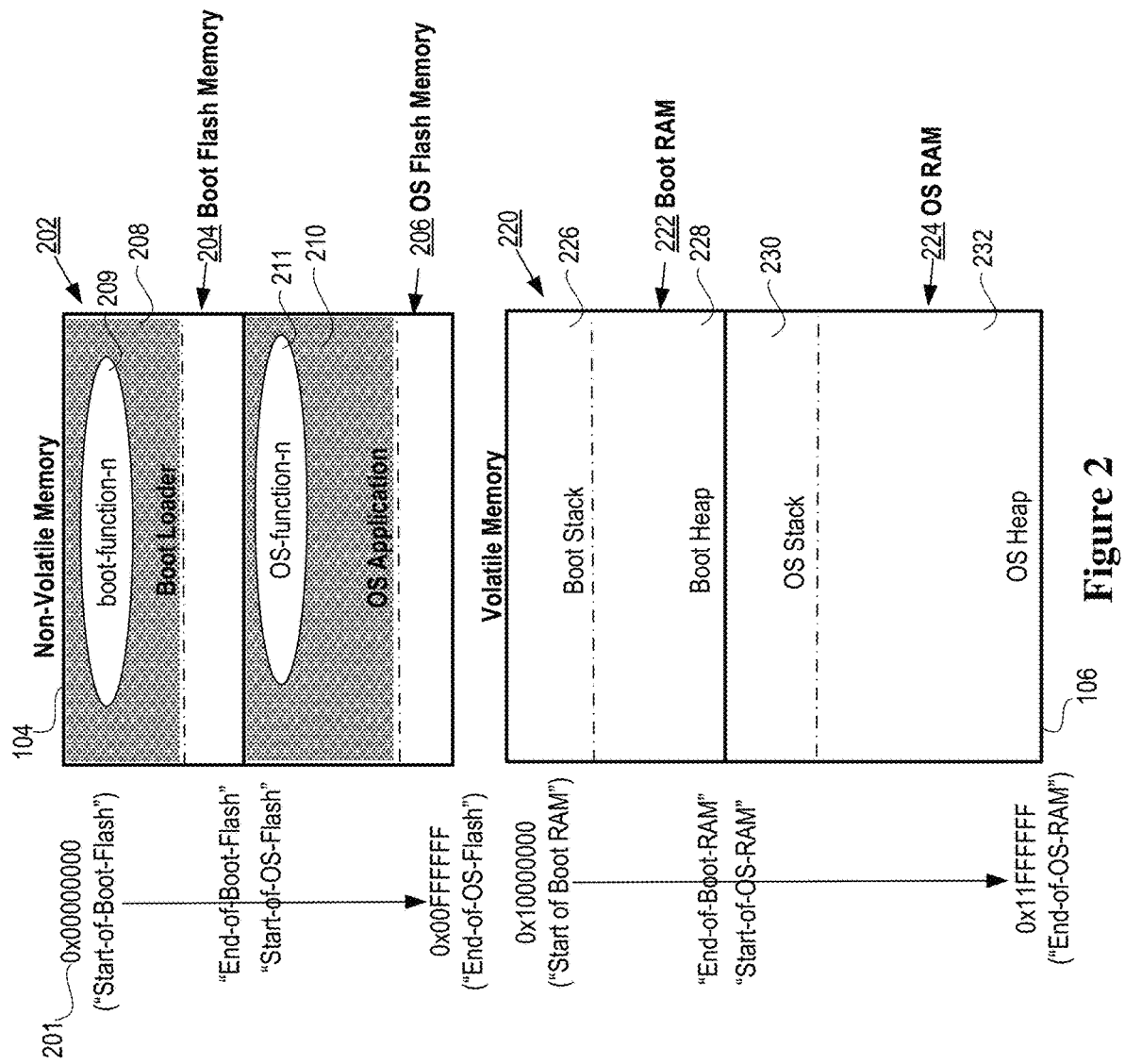
FIG. 2 illustrates an example memory configuration of the computing device of FIG. 1.

Referring now to FIG. 2 there is shown an example layout or configuration 202 of non-volatile memory 104, for example, and an example layout or configuration 220 of volatile memory 106, for example. The example of FIG. 2 and other examples herein are shown using byte-addressing (addresses are designated as 201 in FIG. 2) where each address may represent one 8-bit byte. One will recognize that this is merely an example and other addressing formats may be used, such as word addressing where each address of memory may represent a 16-bit word, for example. In addition, as discussed below non-volatile memory 104 and volatile memory 106 may be referred to as having segments or partitions (these terms may be used interchangeably herein). These segments may have well-defined sizes (e.g., number of bytes) and well-defined locations (i.e., address location and ranges) within the respective memories 104 and 106. The actual sizes and locations of the segments and the sizes of the respective memories 104 and 106 as used herein and as shown in FIG. 2 are merely examples and one will recognize that other sizes and locations may be used. Lastly, when addresses 201 are shown herein, they are represented in hexadecimal format and represent 8-bit bytes although again, other formats may be used.

According to the example of FIG. 2, non-volatile memory 104 may be broken into two or more segments including a first segment 204 and a second segment 206. Segment 204 may be referred to herein for discussion purposes as "boot flash" or "boot flash memory" 204 and segment 206 may be referred to herein as "OS flash" or "OS flash memory" 206. Each of segments 202 and 204 may be of a well-defined size (i.e., a defined number of bytes for example) and be located at well-defined addresses in non-volatile memory 104. In this example, boot flash memory/segment 204 may extend from address 0x00000000 (also referred to herein as "Start-of-Boot-Flash" for description purposes only) to address "End-of-Boot-Flash (which term is used for description purposes only)," and OS flash memory/segment 206 may extend from address "Start-of-OS-Flash" (which term is used for description purposes only) to address 0x00FFFFFF (also referred to herein as "End-of-OS-Flash" for description purposes only). Computing device 100 may be configured such that an application 208 (referred to herein as "boot loader application", "boot loader", "bootstrap" and/or "bootstrap loader" for description purposes) is stored in boot flash memory/segment 204. Application 208 may include one or more instructions that can be executed by processor 102, for example. Computing device 100 may be further configured such that an application 210 (which may be referred to herein as an operating system (OS) application or "OS application" for description purposes only) is stored in OS flash memory/segment 206. Application 210 may include one or more instructions that can be executed by processor 102, for example. While application 210 and segment 206 are referred to herein as an OS application and OS flash memory respectively, the use of the phrase "operating system" or "OS" is for discussion purposes only. Application 210 may be an operating system, it may be an operating system and also include one or more functions or routines that when executed by processor 102 cause computing device 100 to provide one or more specific purposes or features or functions that the computing device 100 is intended to provide in a runtime environment, for example. One will recognize that application 210 may be any other type of application. In general and as one example, boot loader 208 may be an application that is initially executed by processor 102 upon computing device 100 being powered up and/or reset, for example, and that initializes computing device 100 and then causes processor 102 to execute the OS application 210 by transferring control or execution to it. Thereafter, the boot loader 208 may cease to be executed by processor 102. Application 210 may be an application that when executed by processor 102 configures computing device 100 to provide one or more specific purposes or features within a runtime environment, such as a load control system.

More specifically, boot loader 208 may be a software and/or firmware based application. The boot loader application 208 may consist of one or more instructions that may be executed by processor 102. These instructions may be arranged as one or more functions, one of which is representatively shown in FIG. 2 as "boot-function-n" 209 (where "n" is intended to represent that function 209 is possibly one of many functions, such as first, second, third, etc. functions). When computing device 100 is initially powered on and/or is reset, computing device 100 may be configured such that processor 102 automatically executes one or more of functions of the boot loader 208. Functions of the boot loader 208 may include diagnostic functions that determine whether the modules of device 100 are properly functioning, initialization functions that initialize the modules of device 100, etc. One will recognize that these are merely examples and the boot loader application 208 may include other types of functions including, for example, functions that may be executed as a result of a user interacting with the boot loader 208 and/or functions that may be called or invoked from the OS application 210 as further discussed herein. The boot loader 208 may be configured to provide information to a user (such as through LED indicator(s) 112 and visual display screen(s) 130). It may also be configured to allow a user to interact with/control computing device 100 (such as through I/O device(s) 132 and actuator(s) 110), such as to provide information to the boot loader 208, to specifically call or invoke one or more functions of the boot loader, etc. One will recognize that the boot loader 208 may configure computing device 100 to allow a user to interact with computing device 100 in other fashions including, for example, remotely via a network(s) 140 using any of network interface controllers 114, 116, and 118. According to one example and as indicated above, processor 102 may automatically execute one or more functions of the boot loader 208 upon reset and/or power up. The boot loader, once completing execution of one or more diagnostic and initialization functions for example, may cease executing and cause the processor 102 to automatically execute one or more functions of OS application 210 by transferring execution to the OS application.

OS application 210 may be a software and or firmware based application. The OS application 210 may consist of one or more instructions that may be executed by processor 102. These instructions may be arranged as one or more functions one of which is representatively shown in FIG. 2 as "OS-function-n" 211 (where "n" is intended to represent that function 211 is possibly one of many functions, such as first, second, third, etc. functions). The OS application 210 may be, for example, an operating system (OS) application and/or one or more functions that when executed by processor 102 cause computing device 100 to provide one or more specific purposes and/or features within a runtime environment, for example, such as a load control system. The OS application 210 may be configured to execute independently from a user and/or may be configured to allow a user to interact with computing device 100 such as by providing information to a user (such as through LED indicator(s) 112 and visual display screen(s) 130). It may also be configured to allow a user to interact with/control computing device 100 (such as through I/O device 132 and actuator(s) 110) by providing information to the OS application, by calling or invoking one or more functions of the OS application, etc. One will recognize that the OS application may configure computing device 100 to allow a user to interact with d computing device 100 in other fashions including, for example, remotely via a network(s) 140 using any of network interface controllers 114, 116, and 118. According to one example, the OS application 210 may provide limited operating system functionality. As one example, OS application 210 may not provide for dynamic stack management. As one example, computing device 100 may be a bare metal computing system, i.e., a system without a base operating system.

One will recognize that the above described configuration of non-volatile memory 104 is one example, and other example configurations are possible including other types of applications 208 and 210.

Referring now to volatile memory 106 of FIG. 2, the memory may be broken into two or more segments including a first segment 222 and a second segment 224. Segment 222 may be referred to herein for discussion purposes as "boot RAM" 222 and segment 224 may be referred to herein for discussion purposes as "OS RAM" 224. Each of boot RAM/segment 222 and OS RAM/segment 224 may be of a well-defined size (i.e., a defined number of bytes for example) and be located at well-defined addresses in memory 106. In this example, boot RAM 222 may extend from address 0x10000000 (also referred to herein as "Start-of-Boot-RAM" for description purposes only), to address "End-of-Boot-RAM" (which term is used for description purposes only). OS RAM 224 may extend from address "Start-of-OS-RAM" (which term is used for description purposes only) to address 0x11FFFFFF (also referred to herein as "End-of-OS-RAM" for description purposes only). When the boot loader 208 is executed by the processor 102, the boot loader may be configured to cause processor 102 to use boot RAM 222 for at least two purposes, including stack space (e.g., memory space from which memory may be allocated when a boot loader function calls another boot loader function) and heap space (e.g., memory space from which memory may be dynamically allocated by a function(s) of the boot loader 208). For discussion purposes only, the stack space of boot RAM 222 may be referred to herein as "boot stack space" or "boot stack" (an example of which is shown as boot stack 226 in FIG. 2), and the heap space may be referred to herein as "boot heap space" or "boot heap" (an example of which is shown as boot heap 228 in FIG. 2). According to this example, the boot loader 208 may be a single process or thread and as such, there may be only one boot stack 226. Nonetheless, one will recognize that the boot loader may be a multi-process application and may have more than one stack, one for each process/thread. Computing device 100 may be configured such that boot stack 226 is located at a well-defined location and is of a well-defined maximum size. This location and size may be statically defined within the boot loader or defined when the application is compiled, for example. According to this example, the boot stack 226 may be located at address "Start-of-Boot-RAM", and may be a well-defined number of bytes in size, this size referred to herein as "Maximum-Boot-Stack-Size" (which term is used for description purposes only). According to another example, the location of the boot stack 226 in volatile memory 106 may not be statically defined location, i.e., it may be dynamically allocated from memory 106. As described below, it may be necessary to know the location of the boot stack in memory 106. When dynamically allocated, the boot loader 208 may determine its location once allocated.

Similarly, when the boot loader 208 causes processor 102 to transfers execution to the OS application 210 and thus cease executing, the OS application may be configured to cause processor 102 to use OS RAM 224 for at least two purposes, including stack space (e.g., memory space from which memory is allocated when an OS function calls another OS function) and heap space (i.e., space from which memory may be dynamically allocated by function(s) of the OS application). Assuming the OS application is a multi-process/multi-threaded application, for example, each process and/or thread may have its own stack space. For discussion purposes only, one stack space 230 is shown in FIG. 2 (which can be assumed, for discussion purposes only, to be the stack space of a process or thread currently executing on processor 102 when the OS application is executing). For discussion purposes only, this stack will be referred to herein as "OS stack space" or "OS stack" 230, and the heap space of the OS RAM 224 will be referred to herein as the "OS heap space" or "OS heap" (an example of which is shown as OS heap 232 in FIG. 2). Computing device 100 may be configured such that OS stack 230 is located at a defined location (which may be dynamic for a given processes or thread, for example, as the process/thread is created) and is of a well-defined maximum size.

One will recognize that the above described configuration of volatile memory 106 is one example, and other example configurations are possible.

Regarding stack space in general, as in known in the art when a function (e.g., caller function) calls or invokes another function (e.g., callee function), a block of memory may be allocated from or used on a stack by the callee function. This allocated block of memory may be referred to as a stack frame or the callee function's stack frame. As one function calls another function, each function may be allocated a stack frame on the stack. A callee function's stack frame may be used to store various data, or values, or information, for example. For example, the stack frame may be used to save values of one or more registers of processor 102, such as the scratch register values, to allow the callee function to use these registers. When the callee function ends and returns execution to the caller function, these stack values may be returned to the scratch registers, thereby restoring the context of the caller function in the event the caller function was also using the scratch registers. The stack frame may also be used to pass one or function parameters from the caller function to the callee function. The stack frame may be used as allocated space for variables used by the callee function. The stack frame may be used to store a return address of the next instruction to be executed when the callee function returns execution to the caller function. As is known, a processor may have a stack frame pointer register (also referred to herein as a stack frame pointer) that stores an address into the current stack frame. As the caller function calls the callee function, the stack frame pointer register may be updated to point to the callee function's stack frame, with the stack frame pointer register's previous value being stored to the callee function's stack frame. One will recognize that these are merely examples.

At any given time, a portion of the stack may be active (e.g., contain data values as a result of function call(s)) and a portion of the stack may be inactive (e.g., not contain data values as a result of function call(s)). For example, as discussed above as a function call is made (i.e., as a function is called or invoked), data may be added to a stack and the stack may be said to grow. Similarly, as a function ends, data may be removed from the stack and the stack may be said to shrink. Data may be added to and removed from a stack in a last-in-first-out fashion. The adding of data to a stack may be referred to herein as pushing data onto the stack and the removing of data from the stack may be referred to herein as popping data from the stack. A stack may be described herein as growing from its top most, largest address towards its smallest address, although one will recognize that a stack may grow and shrink in the other direction. For example, the boot stack 226 may start at its largest/highest address and grow towards its lowest address with each pushing of data onto the stack (i.e., grow towards the address indicated as "Start-of-Boot RAM" in the example of FIG. 2). As indicated, processor 102 may have a stack pointer register (also referred to herein as a stack pointer) that may contain the address of the top of the stack currently being used by the processor, or in other words, the address of the last data pushed onto the stack. Assuming a stack grows from its top most, largest address towards its smallest address, as a function call is made, processor 102 may push data onto the stack, decrementing the stack pointer with each addition. Similarly, as a function call returns to a caller function, processor 102 may pop data from the stack, incrementing the stack pointer with each removal.

According to one example, when computing device 100 is initially reset and/or powered on, processor 102 may execute the boot loader 208. While this occurs, processor 102 may use the boot stack 226 as the boot loader 208 makes function calls. Here, the stack pointer of processor 102 may point to the boot stack 226 (i.e., the address of the top of the boot stack). As functions of the boot loader 208 need dynamically allocated memory, processor 102 may allocate this memory from boot heap 228. As indicated, the boot loader 208 may perform diagnostic and initialization functions and then cause the processor 102 to execute the OS application 210, with the boot loader 208 ceasing to execute. As the processor 102 executes the OS application 210, it may cease using the boot stack 226 and now use the OS stack 230 as the OS application makes function calls. Here, the stack pointer of the processor 102 may point to the OS stack 230 (i.e., the address of the top of the OS stack). As functions of the OS application 210 need dynamically allocated memory, processor 102 may allocate this memory from OS heap 232.

Figure 3:
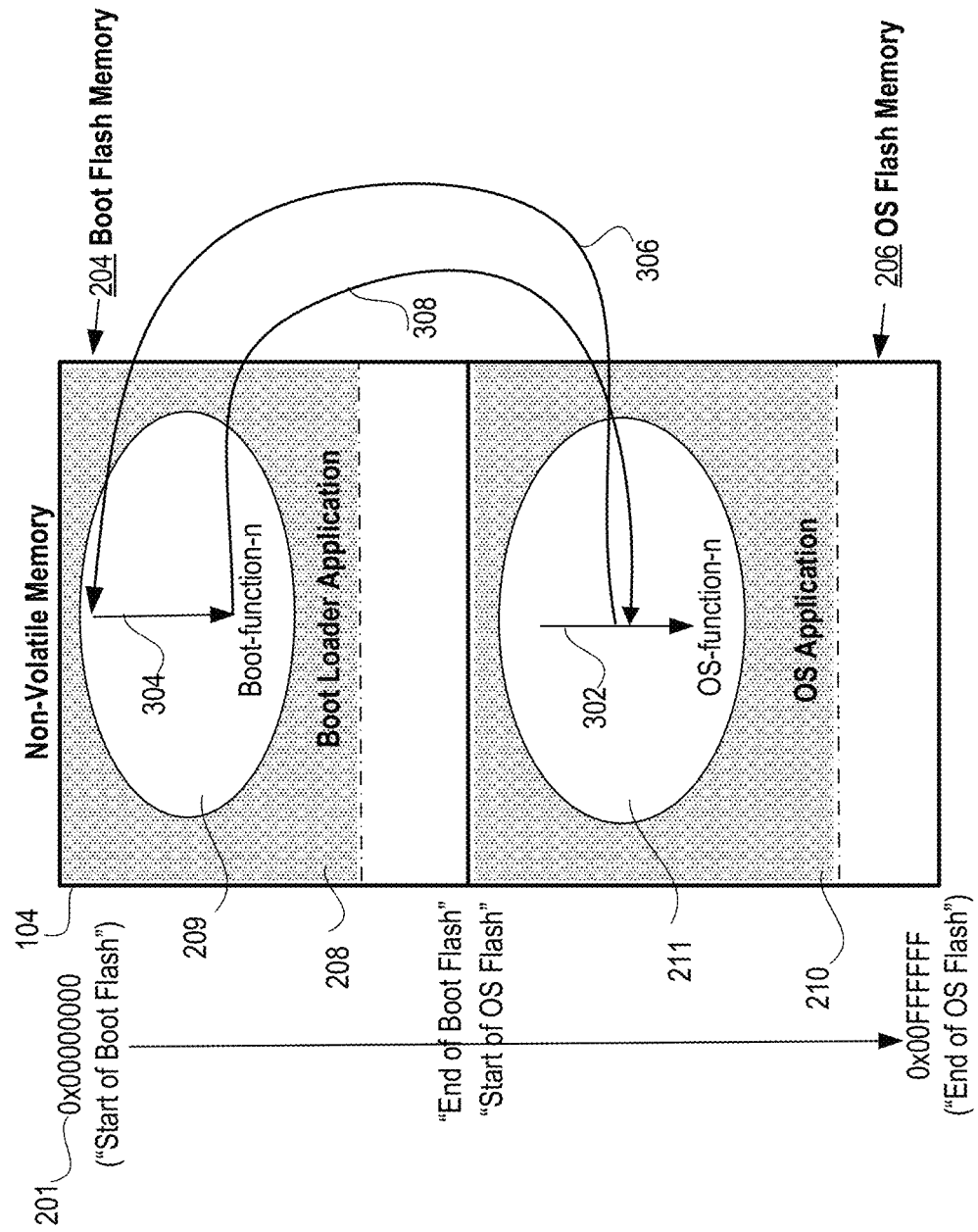
FIG. 3 illustrates a further example memory configuration of the computing device of FIG. 1 and in particular, illustrates an example execution of a first function calling a second function where the first and second functions reside in different memory segments.

According to one example, while processor 102 is executing the boot loader 208, the "boot-function-n" 209 (as one example) may be called/executed. Processor 102 may execute the "boot-function-n" 209 from boot flash memory 204 and in particular, processor 102 may use boot stack 226 in executing the function. Similarly, it may be desirable for the OS application 210 to call one or more functions of the boot loader 208, such as the "boot-function-n" 209. An example may be a function that updates the OS application 210 as further discussed below. One will recognize that it may be desirable for the OS application to call other functions of the boot loader 208, such as diagnostic applications, etc. Referring now to FIG. 3, assuming, for example, that processor 102 is executing the OS application 210 and in particular is executing the "OS-function-n" 211, the processor 102 may execute "OS-function-n" 211 from OS flash memory 206 and use OS stack 230 in executing the "OS-function-n" 211. The execution of "OS-function-n" 211 is represented as vertical line 302. At some point, the "OS-function-n" 211 may call the "boot-function-n" 209 as represented by arrow 306. The processor 102 may execute the "boot-function-n" 209 from boot flash memory 204 (as represented by vertical line 304). However, processor 102 may continue to use OS stack 230 in executing "boot-function-n" 209. The completion of "boot-function-n" 209 may cause the processor 102 to then return to the "OS-function-n" 211 (as represented by arrow 308). Thereafter, processor 102 may continue to execute "OS-function-n" 211 from OS flash memory 206 and use OS stack 230 in executing the "OS-function-n" 211.

As indicated, one example of a "boot-function-n" is a function that may update the OS application 210 (this function is referred to herein as the "OS-update-function" for description purposes only). Such an update may be performed by overwriting a first version of the OS application 210 that is stored in the OS flash memory 206 with a new second version of the OS application. It may be desirable to perform such an update once computing device 100 is within a runtime environment and a new version of the OS application 210 is developed and needs to be deployed. Assuming processor 102 is executing the boot loader 208 and that the computing device 100 is instructed (e.g., by a user) to update the OS application 210, the processor 102 may execute the "OS-update-function" from boot flash memory 204. In doing so, the processor may use boot stack 226. As an example, the "OS-update-function" may cause the processor 102 to load or copy from a network 140 (using, e.g., any of network interface controllers 114, 116, and 118) the second version of the OS application 210 into boot heap 228. Thereafter, the "OS-update-function" may cause the processor 102 to perform one or more checks on the second version of the OS application 210 (such as error checks, version control checks, permission checks, security checks, etc.). If the checks do not pass, the "OS-update-function" may cause the processor 102 to provide an error code or message, for example, to a user and not load the second version of the OS application 210 into OS flash memory 206. Thereafter, the boot loader may cause processor 102 to execute the first version of the OS application 210 as described above. If, however, the checks do pass, the "OS-update-function" may cause the processor 102 to copy the second version of the OS application 210 from boot heap 228 to OS flash memory 206 (overwriting the first version of the OS application, for example), and then cause the processor 102 to execute the now updated second version of the OS application 210 from the OS flash memory 206.

As an alternative, assume now processor 102 is executing the first version of the OS application 210 from OS flash memory 206 and that the device 100 is instructed (e.g., by a user) to update the OS application. In this state, processor 102 may be using the OS stack 230 as function calls are made. Here, the OS application may call the "OS-update-function" of the boot loader 208, causing the processor 102 to execute the function from the boot flash memory 204. In executing the "OS-update-function", the processor may continue to use OS stack 230, not boot stack 226, as similarly described above. Here and as an example, the "OS-update-function" may cause the processor 102 to load or copy from a network 140 (using, e.g., any of network interface controllers 114, 116, and 118) the second version of the OS application 210 into OS heap 232. Thereafter, the "OS-update-function" may cause the processor 102 to perform one or more checks on the second version of the OS application as described above. If the checks do not pass, the "OS-update-function" may cause the processor 102 to provide an error code or message, for example, to a user and not load the second version of the OS application 210 into the OS flash memory 206. Thereafter, processor 102 may continue to execute the first version of the OS application as described above. If, however, the checks do pass, the "OS-update-function" may cause the processor 102 to copy the second version of the OS application from OS heap 232 to OS flash memory 206 (overwriting the first version of the OS application, for example), and then cause computing device and/or processor 102 to reset, executing the boot loader 208 and subsequently the now updated second version of the OS application 210 from OS flash memory 206. One advantage of the OS application 210 calling the "OS-update-function" of the boot loader 208 (as compared to calling, for example, an "OS-update-function" that is part of the OS application 210 and that is therefore located in OS flash memory 206) is that the "OS-update-function" of the boot loader may overwrite the OS application 210 without affecting the execution of "OS-update-function". On the contrary, if the "OS-update-function" were part of the OS application 210, the "OS-update-function" may overwrite itself in updating the OS application 210, thus causing the computing device 100 to have a fault in execution, i.e., to execute in an undefined and/or non-deterministic manner.

The above described examples of the OS application 210 calling a "boot-function-n" 209 (such as the "OS-update-function") that is part of the boot loader 208 may have at least one problem. The boot loader 208 and the OS application 210 may be separate applications, one independently developed of the other and possibly deployed at different times. As one example, a new version of the boot loader 208 may be deployed independently of the OS application 210, which may not be changed. Because the "boot-function-n" 209 is part of the boot loader 208, as the boot loader is developed, the size of boot stack 226 may be appropriately resized to account for the memory needs/requirements of the "boot-function-n" for example. However, because the OS application 210 is a separate application and possibly not updated, the size of the OS stack 230 may not be appropriately sized to account for the needs of the "boot-function-n". As a result, when the "boot-function-n" is called from the OS application 210, it may be possible that a stack overflow occurs in OS stack 230 (i.e., the stack pointer may exceed the bounds/size of the OS stack 23-), causing computing device 100 to behave in undefined and/or non-deterministic manners and then reboot as certain memory spaces of OS RAM 224 are inadvertently overwritten, for example. An issue with this non-deterministic execution/reboot is that one may not know why the reboot occurred. One way to resolve the problem is to always force a reset after the OS application calls a "boot-function-n", but this may not be practical. Another way to resolve the problem is to "try" to oversize the OS stack 230 to account for any "boot-function-n" that the OS application may call. However, this again may not be practical if memory is limited (such as with an embedded device, for example). In addition, if the OS application 210 is a multi-process/multi-threaded application with multiple processes/threads executing at one time, the stack space of each respective process/thread may need to be increased which again, may not be practical.

According to one example that addresses at least the above noted problem, rather than have processor 102 use the OS stack 230 when the OS application 210 calls a "boot-function-n" of the boor loader 208, computing device 100 may be reconfigured to have processor 102 use the boot stack 226 when the OS application 210 calls a "boot-function-n" of the boot loader 208. Upon completion of the "boot-function-n" and return of control to the OS application 210, the computing device 100 may be reconfigured to have processor 102 once again use the OS stack 230. At least one advantage of such a configuration is that because the "boot-function-n" is part of the boot loader 208, the boot stack 226 may be appropriately sized to account for the memory usage needs of the "boot-function-n". Stated another way, a stack of the OS application does not need to be sized to accommodate functions of the boot loader 208. One will recognize that such an operation may be performed for any function of boot load 208 that is called from the OS application 210, not just a function that updates the OS function. More generically, according to examples as described herein, given a computing device with first and second applications, for example, each having its own dedicated stack space (like that of boot stack 226 and OS stack 230), when one application calls the other application the processor of the computing device may use the stack space assigned to the respective application as it execute that application.

Referring now to FIG. 4 there is shown an example code sequence 400, which is a modified version of the "boot-function-n" 209 discussed above with reference to FIGS. 2 and 3. Any "boot-function-n" 209 of the boot loader 208 discussed above with reference to FIGS. 2 and 3 may be similarly written as example code sequence 400. According to this example, the "boot-function-n" 209 discussed above is now renamed as "Boot-Function-N" 402 in FIG. 4. As shown in FIG. 4, the modified "boot-function-n" (shown as function 401 in FIG. 4) has "Boot-Function-N" 402 "wrapped" in two processes or functions referred to herein for discussion purposes only as a "preserveContext" function 404 and as a "restoreContext" function 406. These functions 401, 402, 404, and 406 may be part of/contained in the boot loader application 208.

The "boot-function-n" 401 may be called from either the boot loader 208 or from the OS application 210. When "boot-function-n" 401 is called from the boot loader 208, processor 102 may use the boot stack 226 as the "boot-function-n" 401 is called. As discussed below, the "preserveContext" function 404 and the "restoreContext" function 406 may be configured to cause processor 102 to continue to use the boot stack 226 as "Boot-Function-N" 402 is executed. Similarly, the "boot-function-n" 401 may be called from the OS application 210. Here, processor 102 may be using the OS stack 230 as the "boot-function-n" 401 is called. However, rather than the processor 102 using the OS stack 230 to execute "Boot-Function-N" 402, the "preserveContext" function 404 and the "restoreContext" function 406 may be configured to cause the processor 102 to now use the boot stack 226. More specifically and as further described below, the "preserveContext" function 404 may cause the processor 102 to switch or swap or change from using the OS stack 230 and begin using the boot stack 226 by changing the value within the stack pointer. Thereafter, the processor 102 may execute the "Boot-Function-N" 402. Once done, the "restoreContext" function 406 may cause the processor 102 to switch back from using the boot stack 226 to once again use the OS stack 230 by changing the value within the stack pointer. In this fashion, when the OS application 210 is executing and calls a function of the boot loader 208, the processor may execute the function using the boot stack 226. At least one benefit of such a configuration is that the boot stack 226 may be properly sized to execute "Boot-Function-N". Hence, when the OS application 210 is executing and calls a function of the boot loader 208, the OS application may use two different stacks—the OS stack 230 as "boot-function-n" 401 is called and boot stack 226 as "Boot-Function-N" 402 is called.

According to this example, the "preserveContext" function 404 may return a stack pointer value (shown in FIG. 4 as "stackPointer"). Similarly, the "restoreContext" function 406 may be passed this stack pointer value as a function parameter. This is one example and other examples are possible. In addition, code sequence 400 in general is one example and other implementations are possible. For example, the operations/instructions performed by the "preserveContext" function 404 and the "restoreContext" function 406 may be achieved in other manners. For example, rather than the instructions performed by the "preserveContext" function 404 and "restoreContext" function 406 being implemented as functions, these instructions may be directly placed in-line within the "boot-function-n" 401 function. As another example, rather than "preserveContext" function 404 and "restoreContext" function 406 being part of/contained in the boot loader 208, they may be contained in an external library that is called by "boot-function-n" 401. As another example, the "preserveContext" function 404 and "restoreContext" function 406 may be contained in the OS application 210.

The remainder of the discussion herein assumes that the operations performed by the "preserveContext" function 404 and the "restoreContext" function 406 are implemented as function calls that are called from "boot-function-n" 401. Not all operations discussed below may be necessary if different implementations are used. It is also assumed that the "preserveContext" function 404 may return to a calling function a stack pointer value and that the "restoreContext" function 406 may be passed this value as a function parameter. Again, this is an example and other implementations are possible.

According to a further example, if the OS application 210 is a multi-process/multi-threaded application, the "preserveContext" function 404, for example, may configure processor 102 to not allow a process or thread swap until the completion of "Boot-Function-N" 402, for example (e.g., an operating system scheduler may be prevented from causing one process or thread from stopping execution in place of another process or thread executing). The "restoreContext" function 406, for example, may thereafter reconfigure processor 102 to once again allow a process or thread swap.

Figure 5:
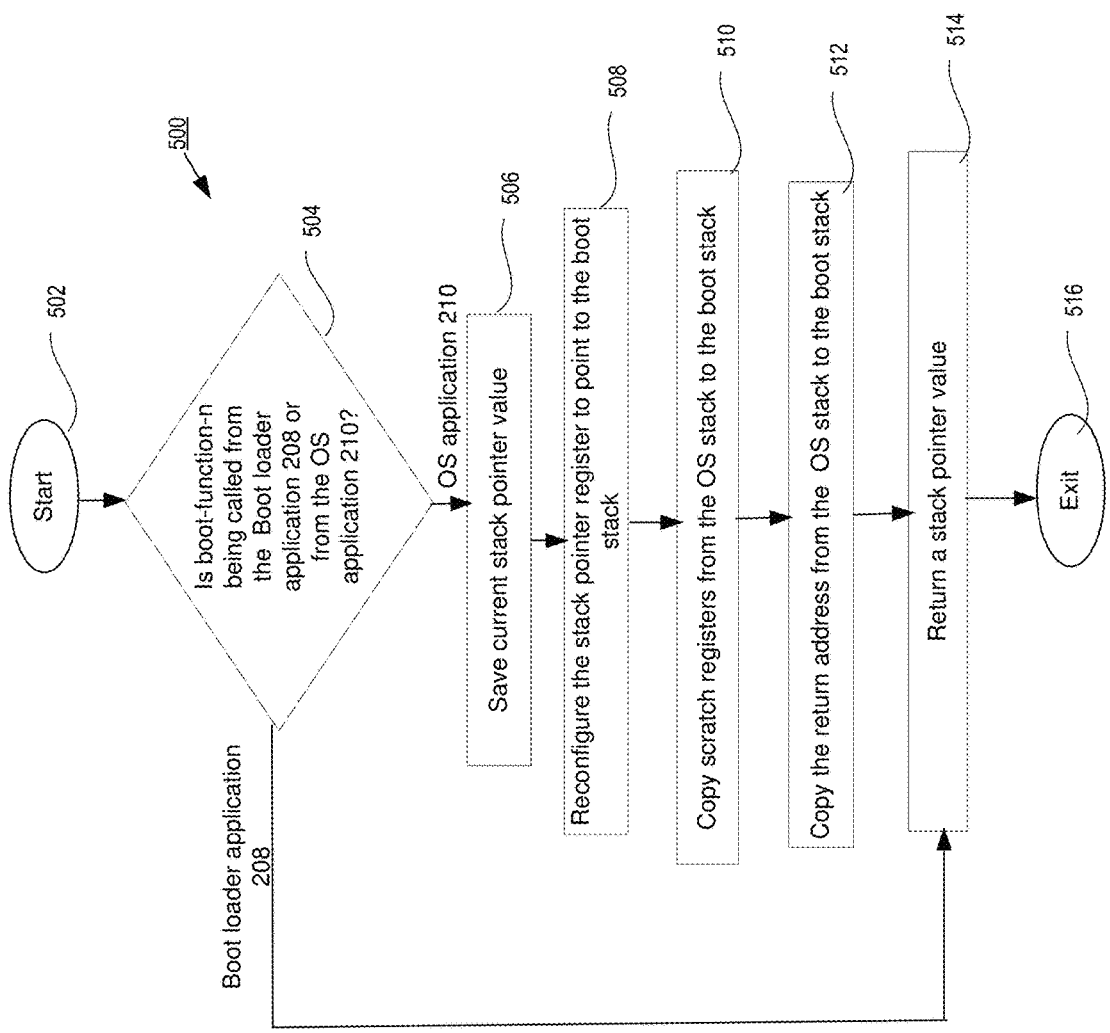
FIG. 5 illustrates an example process of swapping or changing from a first stack to a second stack that may be performed prior to a function being executed.

Referring now to FIG. 5 there is shown a high-level example of a process 500 that may be performed by processor 102 in executing the "preserveContext" function 404. One will recognize that one or more of the example operations/steps of process 500 may be performed in a different order. Once the "preserveContext" function 404 is called (step 502) from "boot-function-n" 401, a determination may first be made at step 504 as to whether the "boot-function-n" 401 is being called from the boot loader 208 or is being called from the OS application 210 (i.e., is being called while the stack pointer is pointing to the boot stack 226 or is pointing to the OS stack 230). As an example, this determination may be made by determining whether the stack pointer is currently pointing to an address within the boot RAM 222 or to an address in the OS RAM 224. If the address is within boot RAM 222, the boot loader 208 may have called "boot-function-n" 401. If the address is within the OS RAM 224, the OS application 210 may have called "boot-function-n" 401. If at step 504 it is determined that the boot loader 208 called "boot-function-n", processor 102 is already using the boot stack 226 and there is no need to switch stacks (again, because using the boot stack 226 in the boot loader context guarantees the size and safety of the boot stack). Here, the process 500 may proceed to step 514 where a value of the stack pointer may be returned to the "boot-function-n" 401 that called the "preserveContext" function 404 (here, the returned stack pointer value may be a value that points to the boot stack 226). Thereafter, process 500 may exit at step 516, with processor 102 continuing to then execute the "Boot-Function-N" 402 as shown in FIG. 4 using the boot stack 226. On the contrary, if at step 504 it is determined that the OS application 210 called "boot-function-n" 401, processor 102 is using the OS stack 230. Here, the process 500 may proceed to step 506 where the current value of the stack pointer may be saved (as an example, this saved value may be used in steps 510 and 512 to copy data/values from the OS stack 230 to the boot stack 226). Thereafter, at step 508 the stack pointer may be reconfigured to point to the boot stack 226, thereby changing/swapping stacks. Because at step 504 it has been determined that "boot-function-n" 401 has been called while the stack pointer is pointing to the OS stack 230, processor 102 may have, for example, pushed onto the OS stack (when the "preserveContext" function 404 was called) scratch register values and the return address of the next instruction the processor is to execute once the "preserveContext" function 404 ends. A compiler (such as a C or C++ compiler) may automatically generate such instructions when the "boot-function-n" 401 and/or the "preserveContext" function 404 are compiled. At steps 510 and 512 these values that were pushed onto the OS stack 230 may be copied from the OS stack to the boot stack 226. In this fashion, as the "preserveContext" function 404 ends with the stack pointer now pointing to the boot stack 226, processor 102 (as it may execute instructions automatically generated by a compiler) may maintain a consistent state, returning to the correct next instruction within "boot-function-n" 401 and also restoring the scratch register values as these values are popped from the boot stack 226. At step 514, the process may proceed to step 514 where the OS stack pointer value saved at step 506 may be returned to "boot-function-n" 401. Thereafter, the process may exit at step 516, with processor 102 proceeding to execute "Boot-Function-N" 402 as shown in FIG. 4, now using the boot stack 226.

Figure 6:
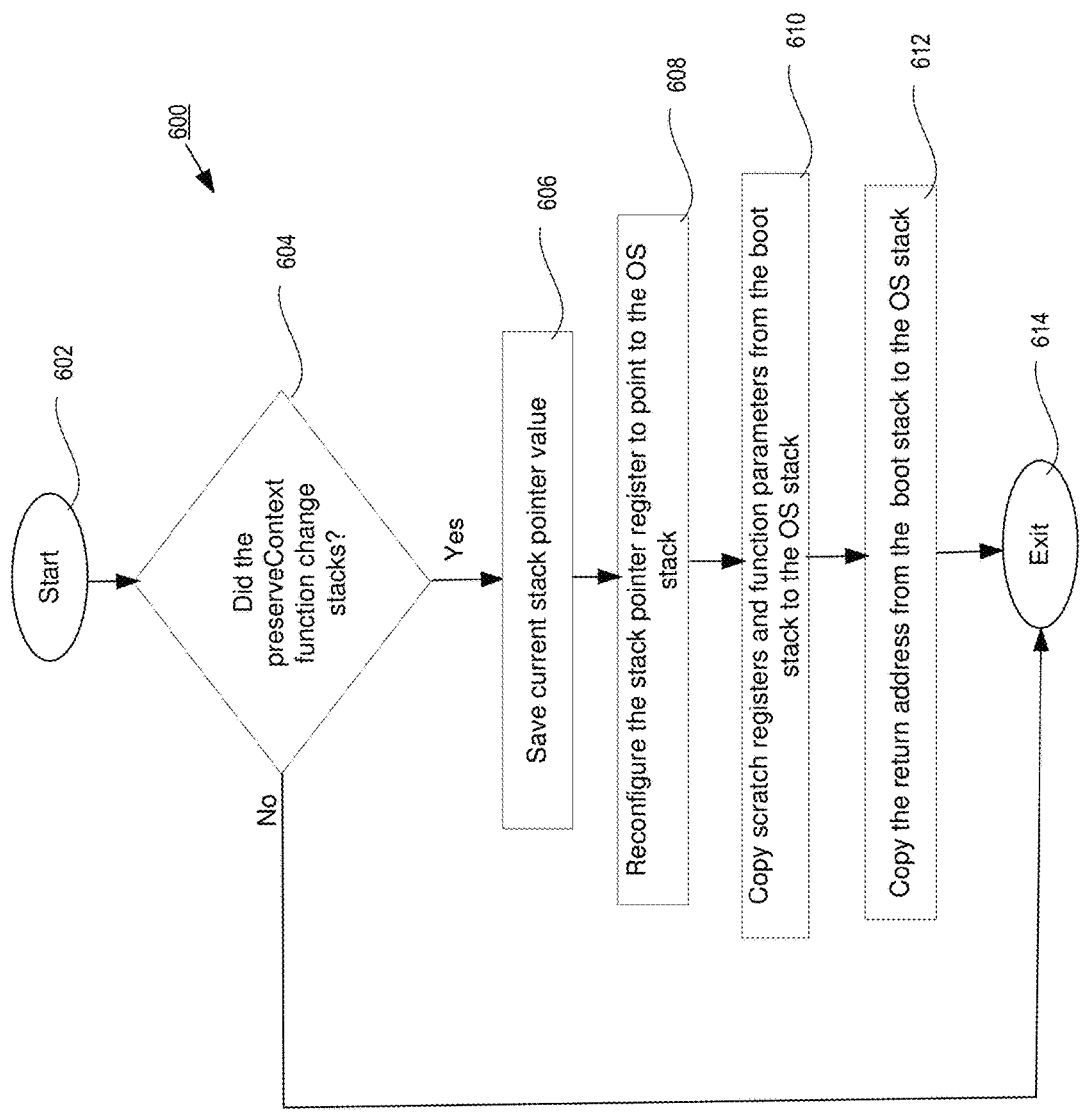
FIG. 6 illustrates an example process of swapping or changing back from a second stack to a first stack that may be performed after a function is executed.

Referring now to FIG. 6 there is shown a high-level example of a process 600 that may be performed by processor 102 in executing the "restoreContext" function 406. One will recognize that one or more of the example operations/steps of process 600 may be performed in a different order. As indicated, this function may be passed, as a function parameter, the stack pointer value returned by the "preserveContext" function 404. Once the "restoreContext" function 406 is called (step 602) from "boot-function-n" 401, a determination may first be made at step 604 as to whether the "preserveContext" function 404 changed the stack pointer to point from the OS stack 230 to the boot stack 226. This determination may be made for example based on the stack pointer value passed to the "restoreContext" function 406 as a function parameter. As an example, if the stack pointer value is in the address range of the boot RAM 222, it may be determined that the "preserveContext" function 404 did not change/swap stacks, and if the stack pointer value is not in the address range of the boot RAM 222 (i.e., is determined to be in the address range of the OS RAM 224), it may be determined that the "preserveContext" function 404 did change/swap stacks. Again, one will recognize that other means may be used to determine whether the "preserveContext" function 404 changed stacks, such as through the use of a flag value (e.g., yes/no) set by the "preserveContext" function 404. One will recognize other examples are possible. If the "preserveContext" function 404 did not change/swap stacks, the process 600 may proceed to step 614, where the process 600 may exit, without changing/swapping stacks and with processor 102 going on to execute the next instruction after the "restoreContext" function 406 as shown in FIG. 4. On the contrary, if at step 604 it is determined that the "preserveContext" function 404 did change/swap stacks, the process 600 may proceed to step 606 where the current value of the stack pointer may be saved (as an example, this saved value may be used in steps 610 and 612 to copy data/values from the boot stack to the OS stack). Thereafter, at step 608 the stack pointer may be reconfigured to point to the OS stack 230 using the stack pointer value passed to the "restoreContext" function 406 as a function parameter, for example, thereby changing/swapping stacks. When the "restoreContext" function 406 was called, processor 102 may have pushed onto the boot stack 226 scratch register values, function parameters, and the return address of the next instruction the processor is to execute once the "restoreContext" function 406 ends. A compiler (such as a C or C++ compiler) may automatically generate such instructions when the "boot-function-n" 401 and/or the "restoreContext" function 406 are compiled. At steps 610 and 612 these values that were pushed onto the boot stack 226 may be copied from the boot stack to the OS stack 230 (because, as determined at step 604, the "preserveContext" function 404 changed/swapped stacks). In this fashion, as the "restoreContext" function 406 ends with the stack pointer now pointing to the OS stack 230, processor 102 may maintain a consistent state, returning to the correct next instruction within "boot-function-n" 401 and also restoring the scratch register values as these values are popped from the OS stack. The process may next proceed to step 614, where the process may exit, with processor 102 going on to execute the next instruction after the "restoreContext" function 406 as shown in FIG. 4, now using the OS stack.

Figure 7A:
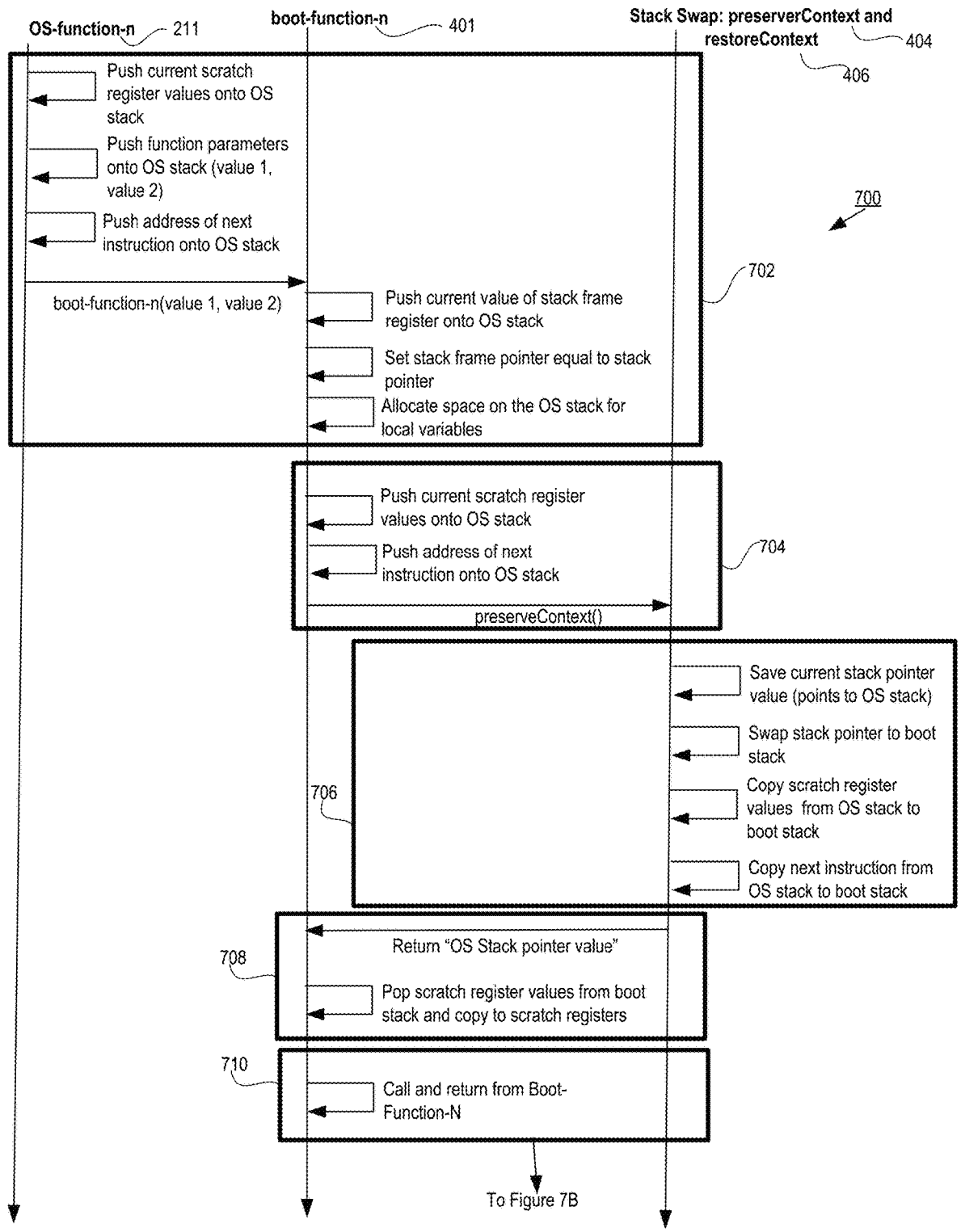
FIGS. 7A-7B illustrate an example process of swapping or changing stacks before and after a function is executed and in particular, pushing data onto and popping data off of these stacks and copying data between these stacks as the swaps between the stacks are made.
Figure 7B:
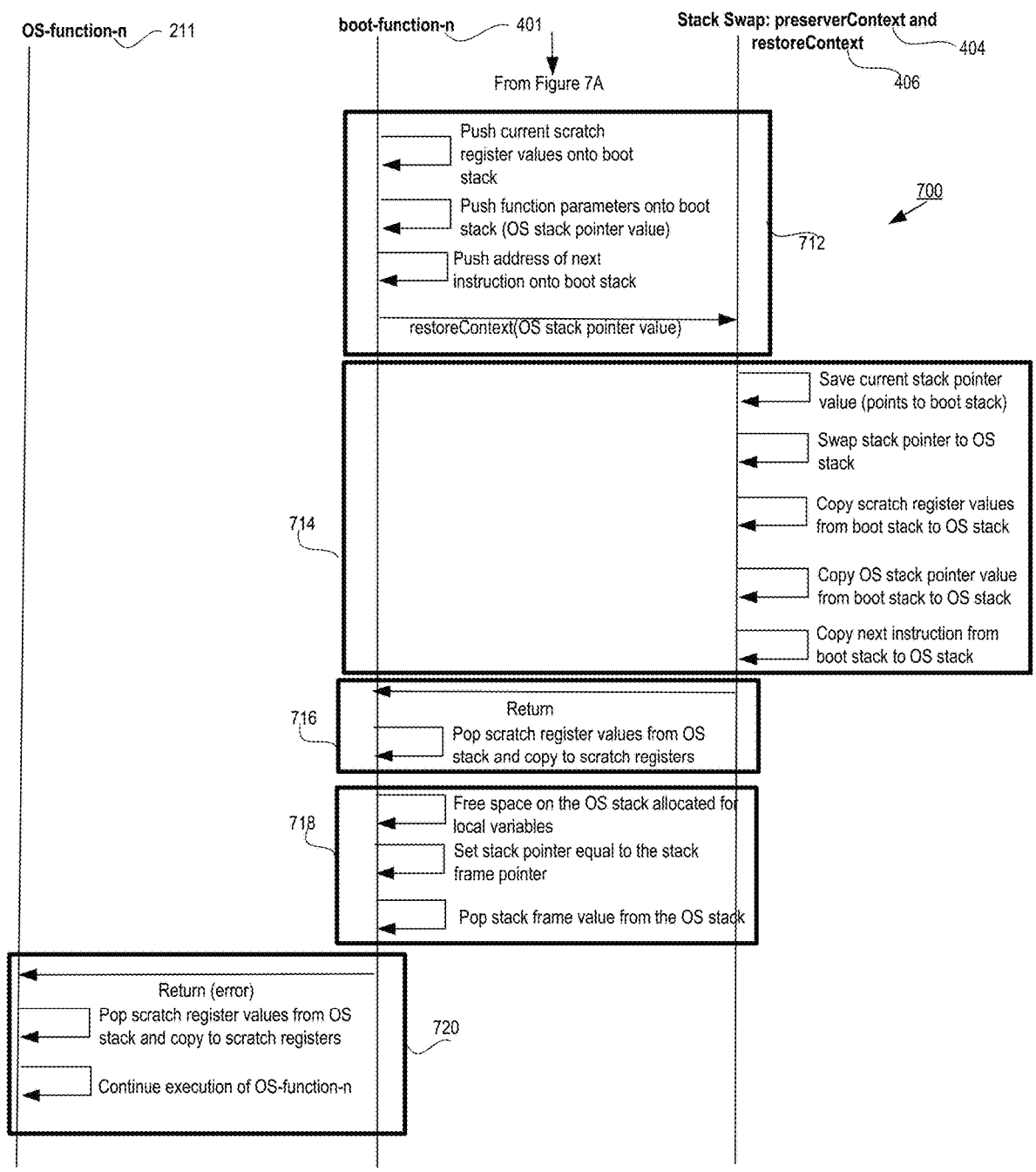

Turning now to FIGS. 7A-7B, there is shown an example sequence 700 of operations that the processor 102 may perform with respect to pushing data values onto and popping data values from the OS stack 230 and the boot stack 226 and the copying of data values between the stacks as an "OS-function-n" 211 calls the "boot-function-n" 401 of FIG. 4. FIGS. 8A-8I show example representations of the OS stack 230 and the boot stack 226 as these operations occur (here, the stacks are growing vertically upward as data values are pushed onto the stacks). Several of the operations represent instructions that may be automatically generated by a compiler (such as a C or C++ compiler) when compiling such a set of functions. One will recognize that while certain push/pop operations are shown in FIGS. 7A-7B as occurring in the context of the caller functions or the callee function, these operations may occur in the context of the other function. In addition, the order of operations shown in FIG. 7A-7B and FIGS. 8A-8I are an example, and other orders are possible. In this example, it is assumed that "boot-function-n" 401 is as shown in FIG. 4, with "boot-function-n" 401 having two function parameters 403 and two local variables 405, and with the "preserveContext" function 404 having no function parameters and the "restoreContext" function 406 having one function parameter 407. It is further assumed that the "preserveContext" function 404 and the "restoreContext" function 406 have no local variables. Again, these are merely examples and other examples are possible, including the operation of the "preserveContext" function 404 and the "restoreContext" function 406 being performed in-line of boot-function-n" 401 and not as function calls as noted above.

Figure 8A:
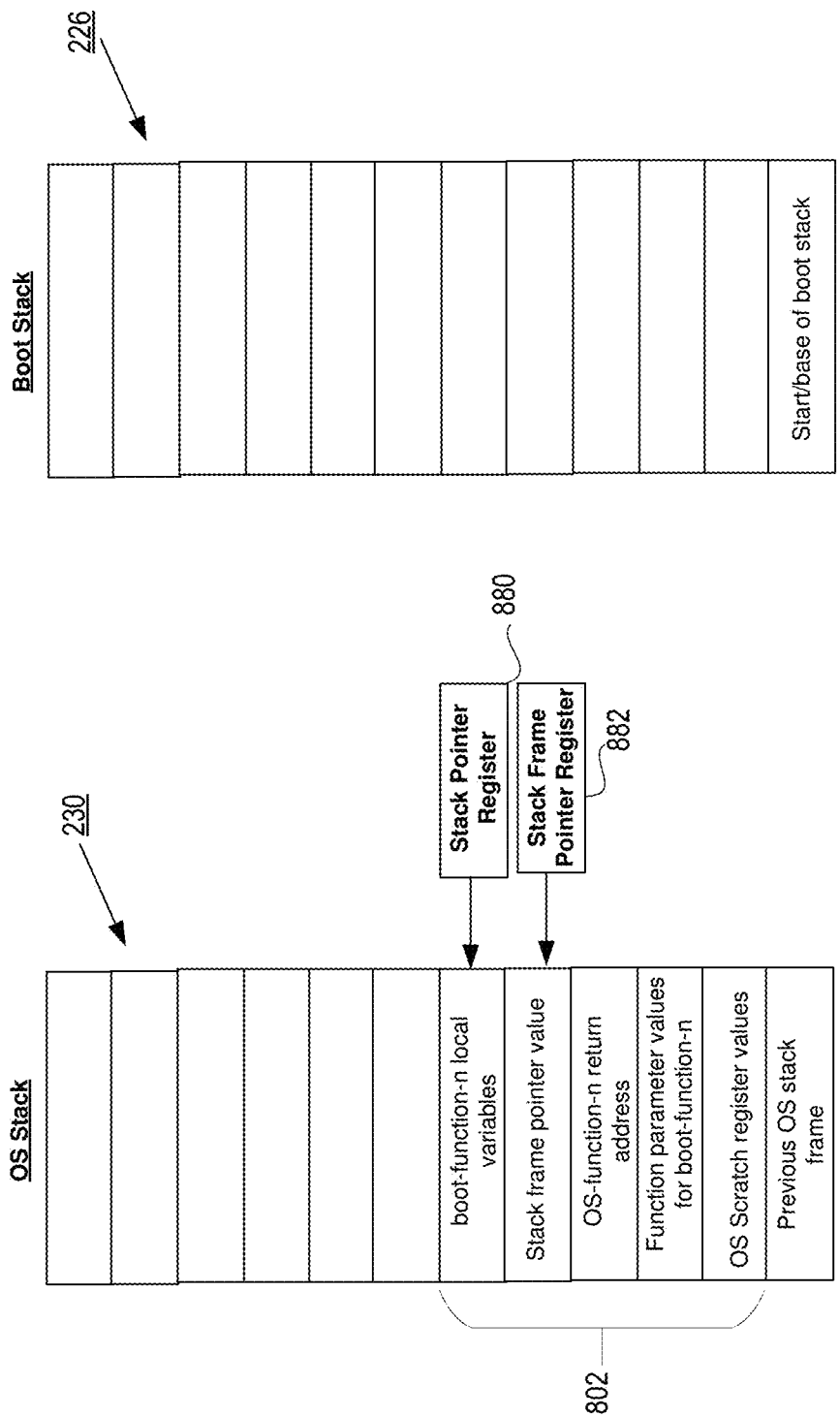
FIGS. 8A-8I illustrate example states of stacks where the states coincide with various points in the process of FIGS. 7A-7B.

Referring to operations 702 in FIG. 7A and to FIG. 8A, as the "OS-function-n" 211 calls the "boot-function-n" 401 with two parameter values (shown here as "value1" and value2"), a stack frame 802 (shown in FIG. 8A) may be allocated on the OS stack 230 for the "boot-function-n" as processor 102 pushes data onto the OS stack. For example, the processor 102 may push onto the OS stack 230: (1) current scratch register values that may be in use by the "OS-function-n" (referred to in FIG. 8A as "OS scratch register values"), (2) function parameter values of the "boot-function-n" 401 (here value1 and value2 and referred to in FIG. 8A as "Function parameter values for boot-function-n"), (3) the address of the next instruction to be executed in "OS-function-n" 211 upon return from "boot-function-n" 401 (referred to as "OS-function-n return address" in FIG. 8A) (this value may be obtained, for example, from the instruction pointer register of processor 102), and (4) a current value of the stack frame pointer register 882 (with processor 102 also then modifying the stack frame pointer register 882 to point to the stack frame 802 as shown in FIG. 8A, which may be done, for example, by setting the stack frame pointer equal to the stack pointer after pushing the stack frame pointer value onto the stack). In addition, processor 102 may allocate space on the OS stack 230 for local variables 405 of the "boot-function-n" (referred to as "boot-function-n local variables" in FIG. 8A). One will recognize that as processor 102 "calls" a function such as "boot-function-n" 401 as described herein, it may also load into the instruction pointer register an instruction address of the called function in order to execute the function. Operations 702 may be automatically generated by a compiler when compiling "OS-function-n" 211 and the "boot-function-n" 401. Again, one will recognize that while certain push operations are shown in operations 702 and FIG. 8A as occurring in the context of "OS-function-n" 211 and in the context of "boot-function-n" 401, one or more operations may occur in the context of the other function. FIG. 8A shows an example state of the OS stack 230 and the boot stack 226 at the completion of operations 702. As the processor 102 pushes data onto the OS stack, it may move the stack pointer register 880 to point to the top of the OS stack (e.g., the last data value pushed onto the stack).

Figure 8B:
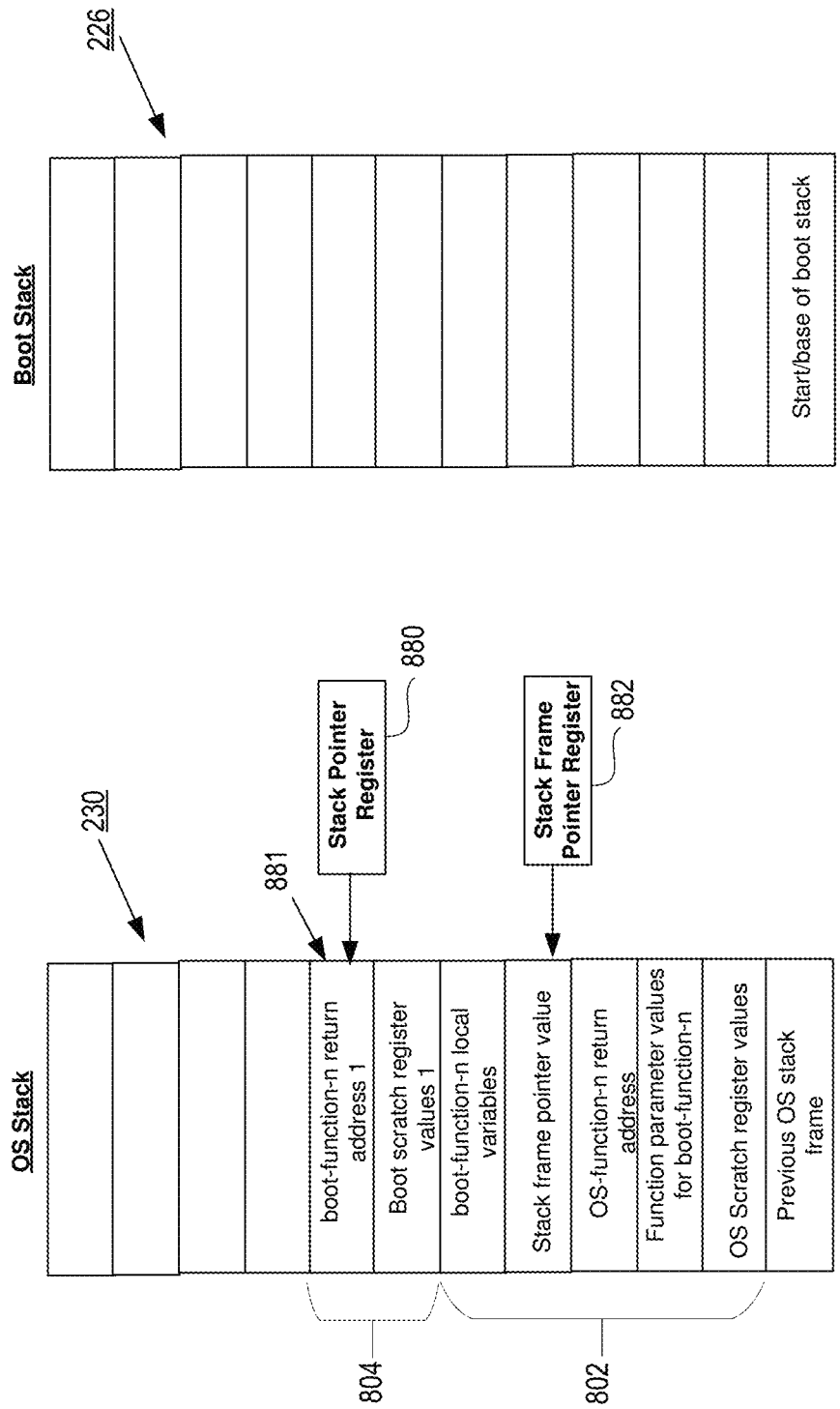

Referring now to operations 704 in FIG. 7A and to FIG. 8B, as the "boot-function-n" 401 calls the "preserveContext" function 404 (again, in this example no function parameter values are being passed to the "preserveContext" function and the "preserveContext" function is assumed to not have local variables), a stack frame 804 may be allocated on the OS stack 230 for the "preserveContext" function as processor 102 pushes data onto the OS stack. For example, the processor 102 may push onto the OS stack 230: (1) current scratch register values that may be in use by the "boot-function-n" 401 (referred to in FIG. 8B as "Boot scratch register values 1"), and (2) the address of the next instruction to be executed in "boot-function-n" 401 upon return from the "preserveContext" function 404 (referred to as "boot-function-n return address 1" in FIG. 8B). Operations 704 may be automatically generated by a compiler. According to this example, the "preserveContext" function 404 may be configured to not push onto the OS stack a current value of the stack frame pointer 882 and in particular, may be configured to not alter the value in the stack frame pointer, leaving it pointing to stack frame 802 (as an example, compiler options may be used to cause the "preserveContext" function to not alter the stack frame pointer 882) (Similarly, as the "preserveContext" function 404 ends as discussed below with respect to operations 708, the "preserveContext" function and/or "boot-function-n" may be configured to not alter the value in the stack frame pointer). This may allow, for example, the processor 102 to properly return back to the "OS-function-n" 211 at the completion of "boot-function-n" 401. FIG. 8B shows an example state of the OS stack 230 and boot stack 226 at the completion of operations 704. As the processor 102 pushes data onto the OS stack, it may move the stack pointer register 880 to point to the top of the OS stack.

Figure 8C:
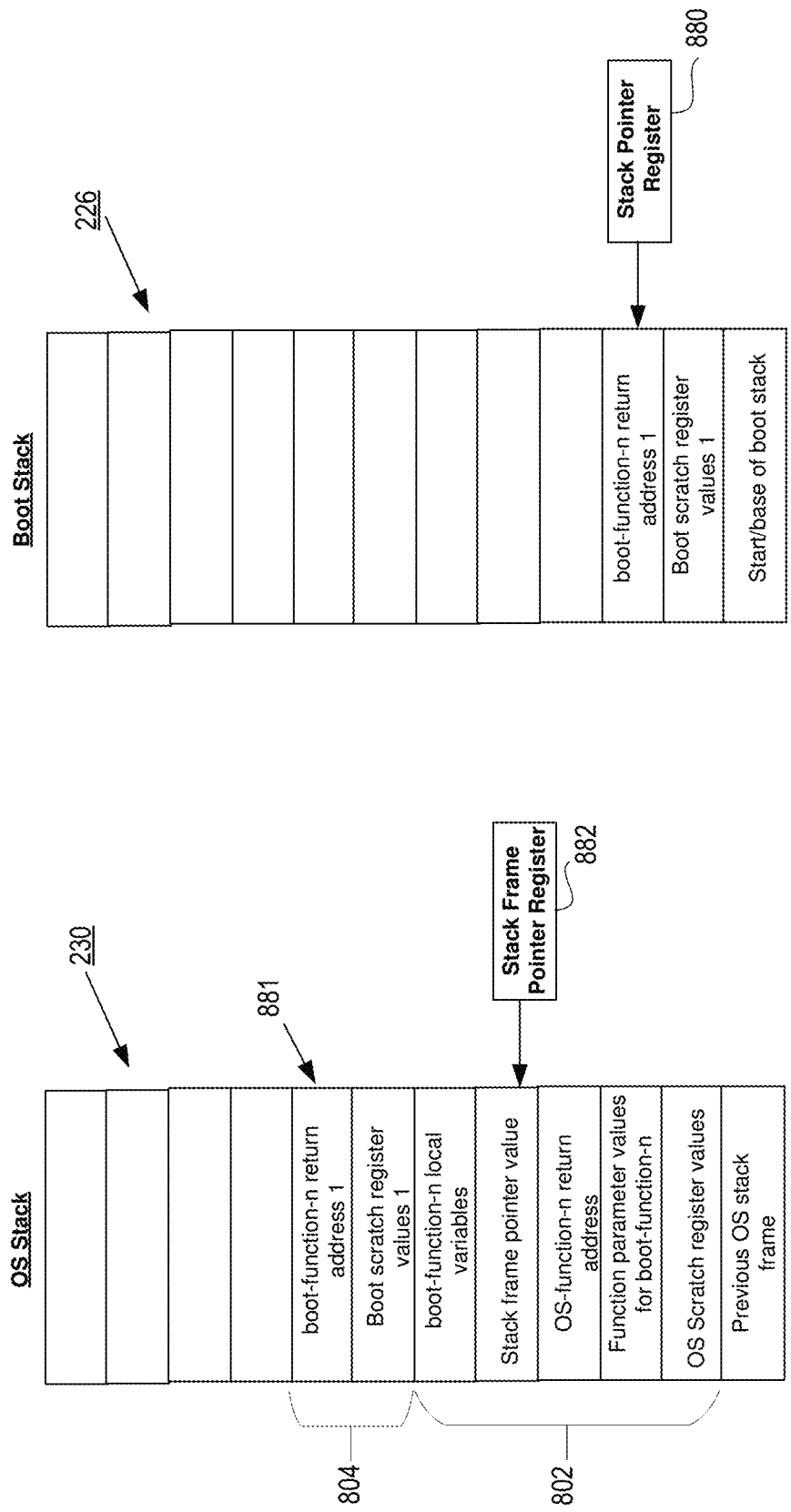

Referring now to operations 706 in FIG. 7A and to FIG. 8C, the "preserveContext" function 804 may now perform stack swap operations, moving or changing the stack pointer 880 from the OS stack 230 to the boot stack 226 prior to the execution of "Boot-Function-N" 402. According to the example of FIG. 7A, it is being assumed that the preserveContext function 804 is being called while the stack pointer is pointing to the OS stack (i.e., operation 504 of FIG. 5 is not shown in this example). The "preserveContext" function 804 may be configured to first cause processor 102 to save the current value of the stack pointer (which may be pointing to position 881 of the OS stack 230). Processor 102 may save this value to a register (such as register % d0). Thereafter, the "preserveContext" function 804 may cause processor 102 to reconfigure the stack pointer to point to the boot stack 226 (such as to the start or base of the boot stack). Next, the "preserveContext" function 804 may cause processor 102 to copy from the OS stack 230 to the boot stack 226 the scratch register values and the next executable instruction that were pushed onto the OS stack in operations 704, or in other words, to copy stack frame 804 of the OS stack to the boot stack including the "Boot scratch register values 1" and the "boot-function-n return address 1". These copies may be necessary for at least two reasons. First, as the "preserveContext" function 804 ends, the processor 102 may look to the boot stack to determine which instruction should next be executed. Second, similar to the scratch register values being pushed onto the OS stack 230 as the "preserveContext" function is called (operations 704), as the "preserveContext" function ends the processor 102 (as a result of automatically generated compiler code, for example) may pop values from the boot stack and put these values into the scratch registers Hence, the "preserveContext" function 804 may not only swap the stacks, but may ensure a consistent context or state when making this swap as function calls return. As the processor 102 pushes data onto the boot stack 226, it may move the stack pointer 880 to point to the top of the boot stack. FIG. 8C shows an example state of the OS stack 230 and boot stack 226 at the completion of operations 706.

Figure 8D:
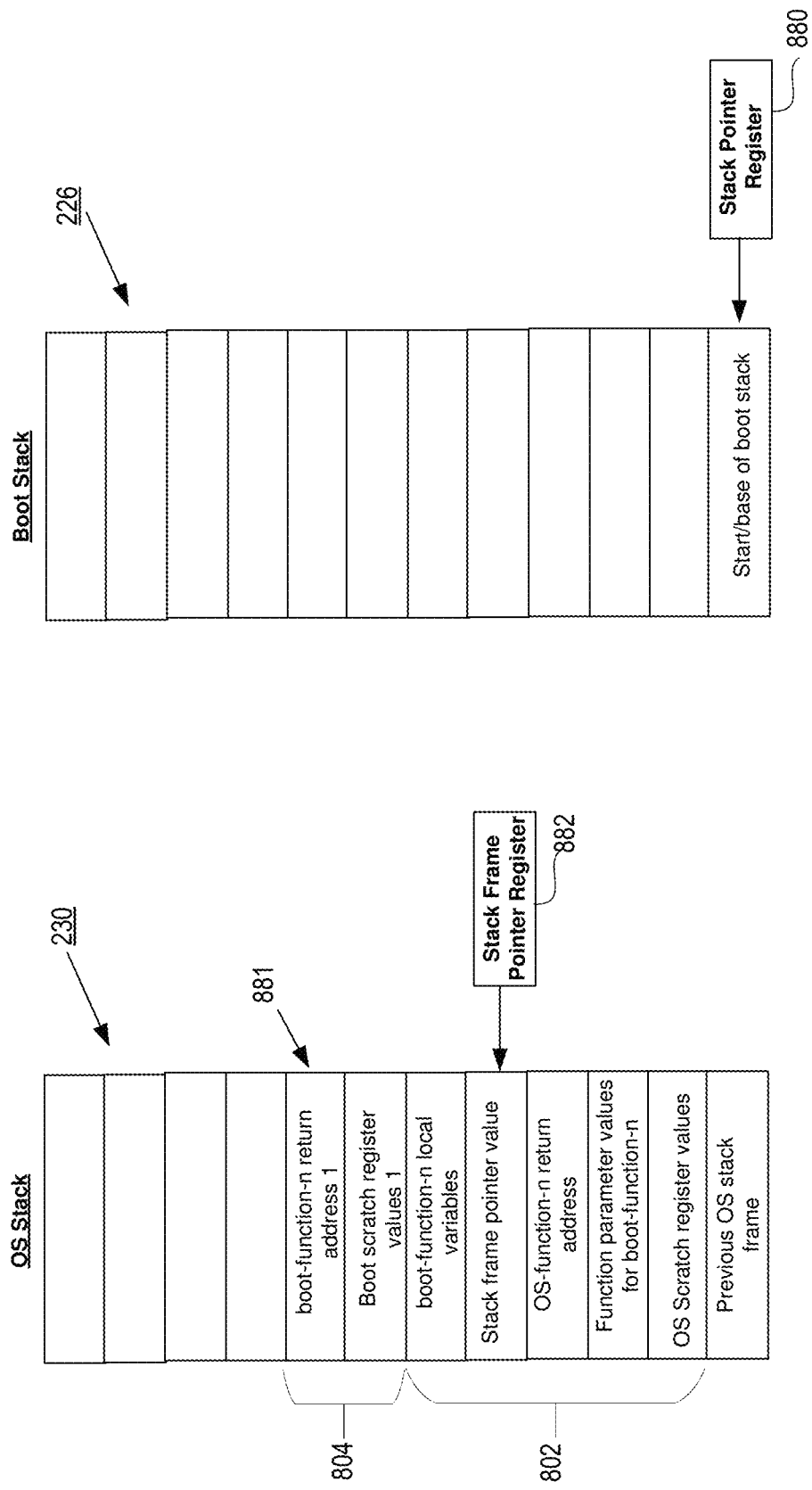

Referring now to operations 708 of FIG. 7A and to FIG. 8D, as the "preserveContext" function 404 ends and returns to "boot-function-n" 401, processor 102 may pop from the boot stack 226 the "boot-function-n return address 1" (this operation is not shown in FIG. 7A) to determine the next instruction within "boot-function-n" 401 to execute upon return from the "preserveContext" function 404, may return to "boot-function-n" as a return value (such as through the % d0 register) the last position of the OS stack prior to the swap (i.e., position 881 and referred to as "OS Stack pointer value" in FIG. 7A), and may pop the "boot scratch register values 1" from the boot stack and copy these values into the scratch registers. Again, operations 708 may be automatically generated by a compiler when compiling "boot-function-n" 401 and the "preserveContext" function 404. As the processor 102 pops data off of the boot stack 226, it may move the stack pointer 880 within the stack to once again point to base of the stack, for example. FIG. 8D shows an example state of the OS stack 230 and boot stack 226 at the completion of operations 708.

Referring now to operations 710 of FIG. 7A, "boot-function-n" 401 may next call "Boot-Function-N" 402. Processor 402 may call "Boot-Function-N" 402, pushing data values onto the boot stack 226 as the call is made, may execute the instructions of this function which may include calling one or more additional functions and continuing to use the boot stack 226 during these operations, and upon completion of "Boot-Function-N" may pop values from the boot stack and return to "boot-function-n" 401. Upon returning back to "boot-function-n" 401, the state of the OS stack 230 and the boot stack 226 and the state of the stack pointer 880 and the stack frame pointer 882 may again appear as shown in FIG. 8D.

Figure 8E:
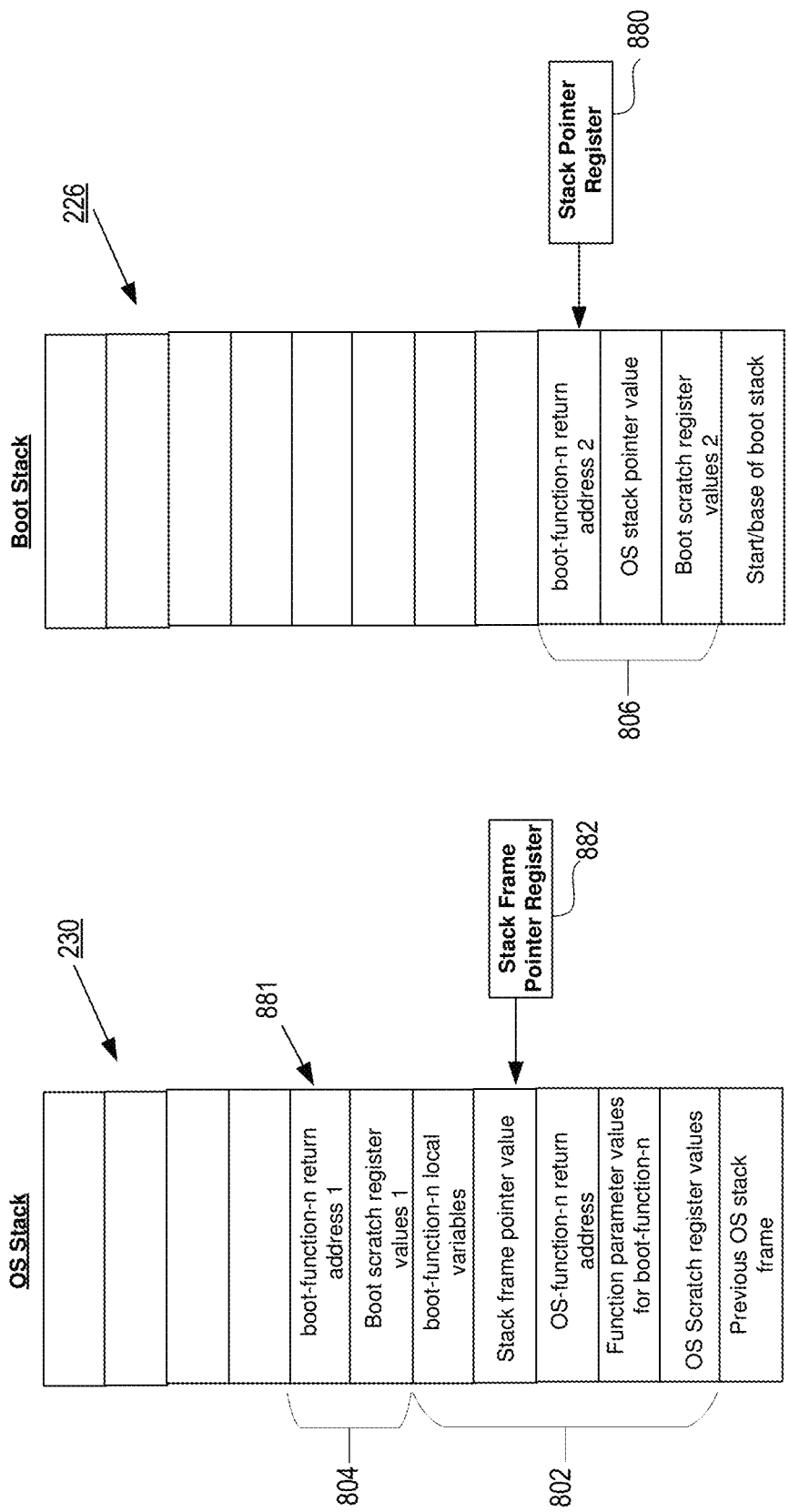

Referring now to operations 712 as shown in FIG. 7B and to FIG. 8E, as the "boot-function-n" 401 calls the "restoreContext" function 406 a stack frame 806 may be allocated on the boot stack 226 for the "restoreContext" function as processor 102 pushes data onto the boot stack. For example, the processor 102 may push onto the boot stack 226: (1) current scratch register values that may be in use by the "boot-function-n" 401 (referred to in FIG. 8E as "Boot scratch register values 2"), (2) function parameter values of the "restoreContext" function 406 (here the "OS stack pointer value" returned by the "preserveContext" function 404) (again, the "OS stack pointer value" may be pointing to position 881 of the OS stack 230), and (3) the address of the next instruction to be executed in "boot-function-n" 401 upon return from the "restoreContext" function 406 (referred to as "boot-function-n return address 2" in FIG. 8E). Operations 712 may be automatically generated by a compiler. According to this example, like the "preserveContext" function 404, the "restoreContext" function 406 may be configured to not push onto the boot stack 226 a current value of the stack frame pointer 882 and in particular, may be configured to not alter the value in the stack frame pointer, leaving it pointing to stack frame 802 (Similarly, as the "restoreContext" function 406 ends as discussed below with respect to operations 716, the "restoreContext" function and/or "boot-function-n" may be configured to not alter the value in the stack frame pointer). This may allow, for example, the processor 102 to properly return back to the "OS-function-n" 211 at the completion of "boot-function-n" 401. FIG. 8E shows an example state of the OS stack 230 and boot stack 226 at the completion of operations 712. As the processor 102 pushes data onto the boot stack 226, it may move the stack pointer 880 to point to the top of the boot stack 226.

Figure 8F:
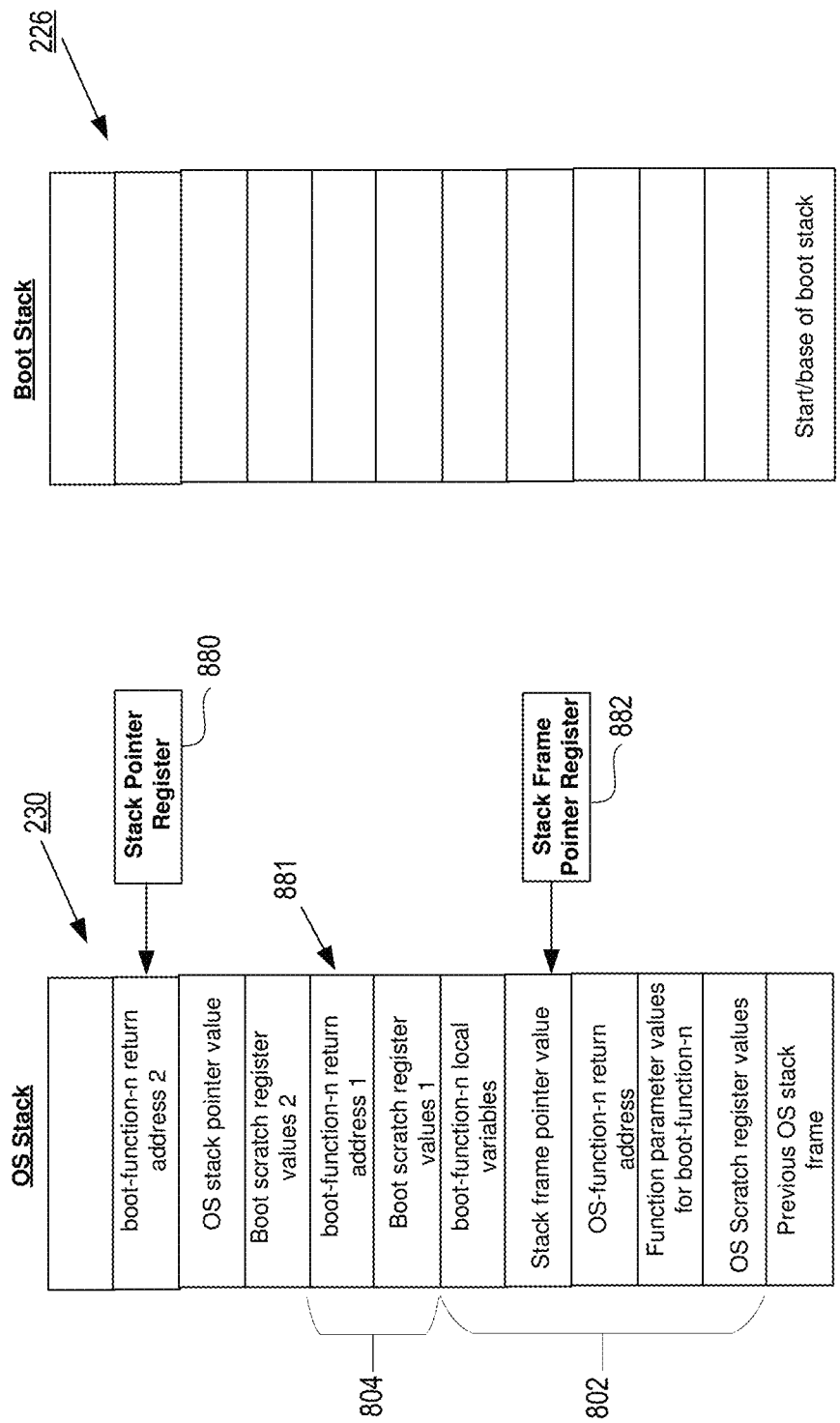

Referring now to operations 714 in FIG. 7B and to FIG. 8F, the "restoreContext" function 806 may next perform stack swap operations, moving the stack pointer 880 from the boot stack 226 back to the OS stack 230 now that "Boot-Function-N" 402 has completed. According to the example of FIG. 7B, it is being assumed that the restoreContext function 406 is being called while the stack pointer 880 is pointing to the boot stack 226 as a result of the "preserveContext" function 404 moving/swapping the stack pointer 880 from the OS stack 230 to the boot stack 226 (i.e., operation 604 of FIG. 6 is not shown in this example). The "restoreContext" function 806 may be configured to first cause processor 102 to save the current value of the stack pointer (which is pointing to the boot stack 226). Processor 102 may save this value to a register (such as register % d0). Thereafter, the "restoreContext" function may cause processor 102 to reconfigure the stack pointer 880 to point to the OS stack 230 using the "OS stack pointer value" passed to the function as a function parameter (i.e., to point to position 881 of the OS stack 230). Next, using the stack pointer 880 (which is pointing to the OS stack 230) and register % d0, for example (which is pointing to the boot stack 226), the "restoreContext" function 406 may cause processor 102 to copy from the boot stack 226 to the OS stack 230 the scratch register values, the function parameters, and the next executable instruction that were pushed onto the boot stack in operations 712, or in other words, to copy stack frame 806 of the boot stack 226 to the OS stack 230 including the "boot scratch register values 2", "OS stack pointer value", and the "boot-function-n return address 2". Again, these copies may be necessary for at least two reasons. First, as the "restoreContext" function ends, the processor may now look to the OS stack 230 to determine which instruction should next be executed. Second, similar to the scratch register values and function parameters being pushed onto the boot stack 226 as the "restoreContext" function is called (operations 712), as the "restoreContext" function ends the processor 102 (as a result of automatically generated compiler code, for example) may pop values from the OS stack 230, putting the scratch register values into the scratch registers. Hence, the "restoreContext" function 406 may not only swap the stacks, but may ensure a consistent context or state when making this swap as function calls return. As the processor 102 pushes data onto the OS stack 230, it may move the stack pointer 880 with the stack pointer pointing to the top of the OS stack. FIG. 8F shows an example state of the OS stack 230 and boot stack 226 at the completion of operations 714.

Figure 8G:
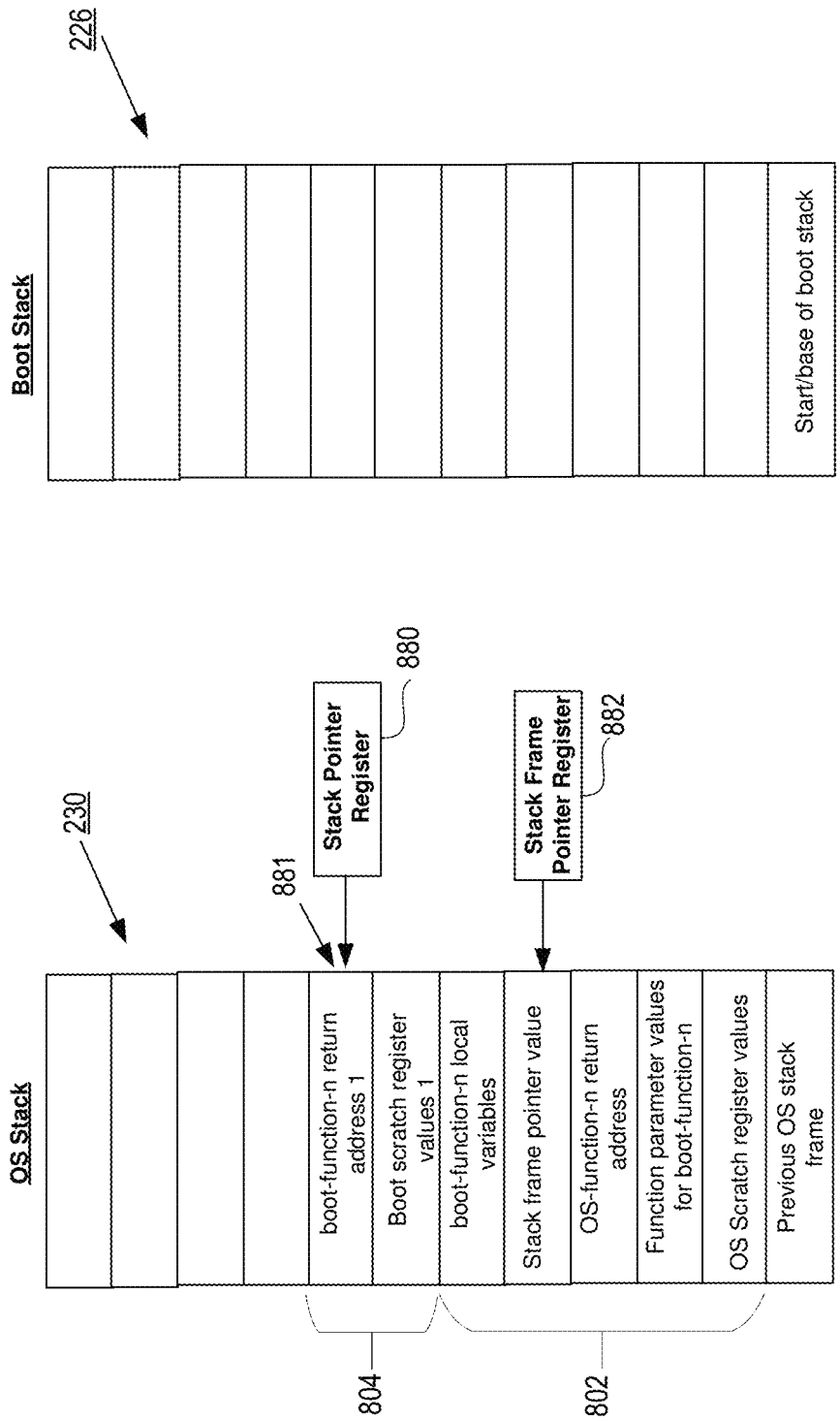

Referring now to operations 716 of FIG. 7B and to FIG. 8G, as the "restoreContext" function 406 ends and returns to "boot-function-n" 401, processor 102 may pop from the OS stack 230 the "boot-function-n return address 2" to determine the next instruction within "boot-function-n" 401 to execute, and may also pop the "OS stack pointer value" (discarding the value) and the "boot scratch register values 2" from the OS stack and copy the scratch register values into the scratch registers. Again, operations 716 may be automatically generated by a compiler when compiling "boot-function-n" 401 and/or "restoreContext" function 406. As the processor 102 pops data off of the OS stack 230, it may move the stack pointer 880 within the stack to once again point to position 881, for example. FIG. 8G shows an example state of the OS stack 230 and boot stack 226 at the completion of operations 716.

Figure 8H:
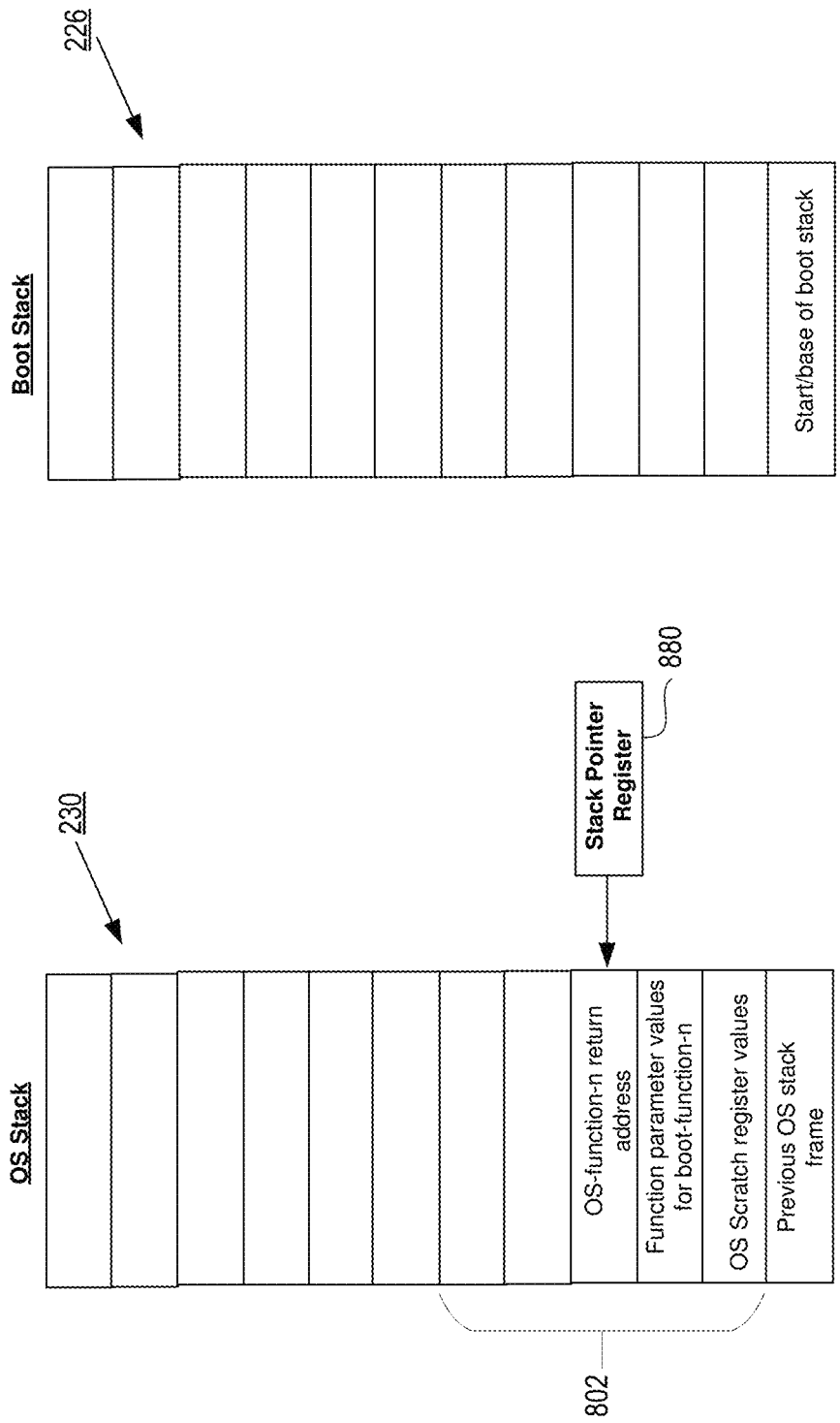

Referring now to operations 718 of FIG. 7B and to FIG. 8H, as "boot-function-n" 401 ends, processor 102 may copy the stack pointer 880 to the stack frame pointer 882 thereby positioning the stack pointer to point to the "Stack frame pointer value" in frame 802 and thereby also reallocate space on the OS stack that was allocated in operation 702 for "boot-function-n local variables". Thereafter, processor 102 may pop the "stack frame pointer value" from the OS stack and copy the value into the stack frame pointer 882, thereby causing the stack frame pointer to point to the previous stack frame. In so doing, processor 102 may move the stack pointer 880 to point to the "OS-function-n return address" of stack frame 802. Operations 718 may be automatically generated by a compiler when compiling "boot-function-n" 401 for example. FIG. 8H shows an example state of the OS stack 230 and boot stack 226 at the completion of operations 718.

Figure 8I:
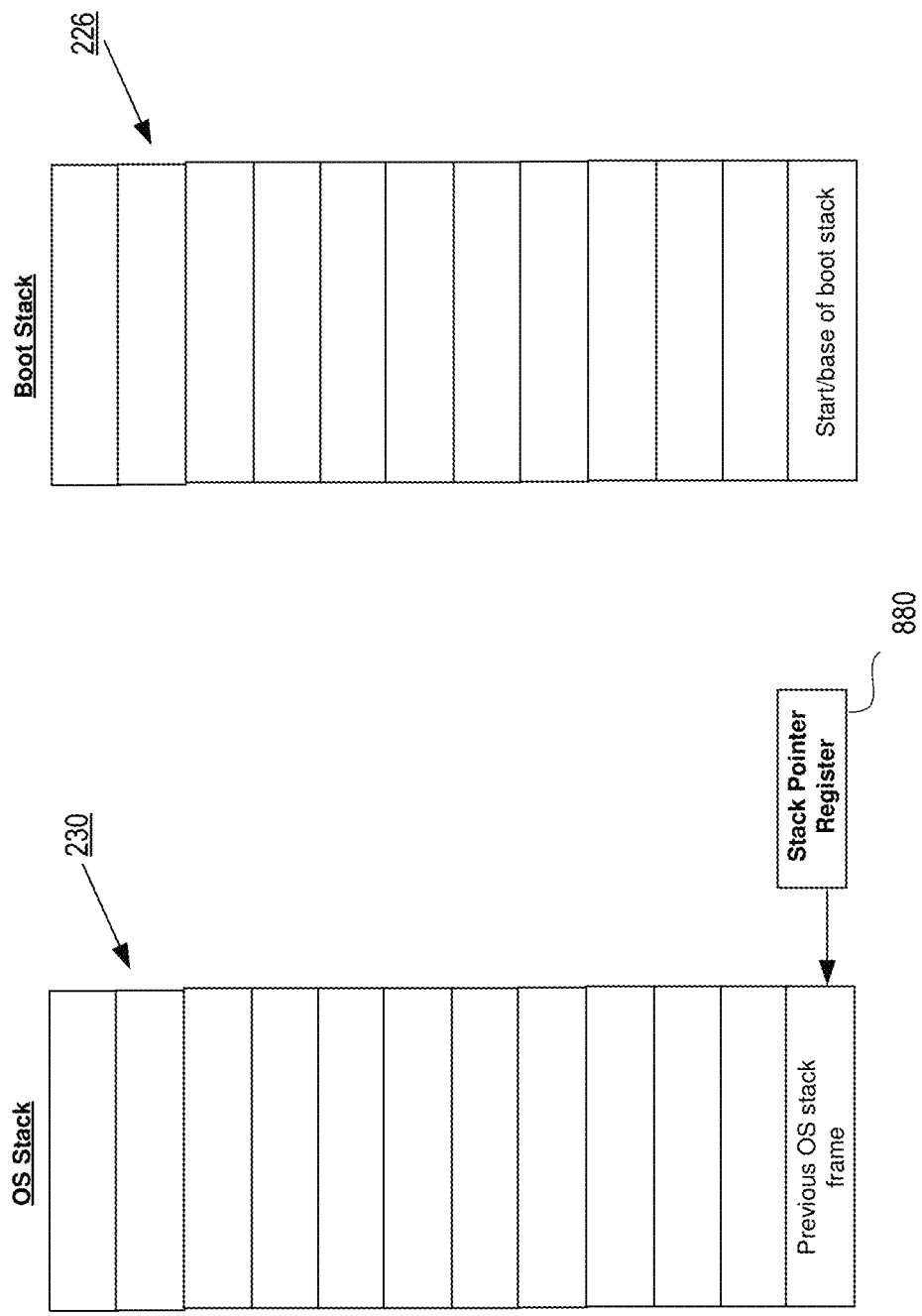

Referring now to operations 720 of FIG. 7B and to FIG. 8I, as "boot-function-n" 401 ends and returns to "OS-function-n" 211, processor 102 may pop from the OS stack 230 the "OS-function-n return address" to determine the next instruction within "OS-function-n" 211 to execute, may pop the "Function parameter values for boot-function-n" (discarding the value), may pop the "OS scratch register values" from the OS stack and copy the scratch register values into the scratch registers, and may return to "OS-function-n" as a return value (such as through the % d0 register) an error value (if there is one). Again, operations 716 may be automatically generated by a compiler when compiling "boot-function-n" 401 and/or "OS-function-n" 211. As the processor 102 pops data off of the OS stack 230, it may move the stack pointer 880 within the stack to once again point to the previous stack frame, for example. Thereafter, processor 102 may continue to execute instructions of "OS-function-n". FIG. 8I shows an example state of the OS stack 230 and boot stack 226 at the completion of operations 720.

Referring now to FIG. 9, there is shown an example code sequence 900 that includes an example implementation of the "preserveContext" function 404 as described herein. In this example, % sp, % d0, and % a0 may represent registers of processor 102 with register % sp being the stack pointer register 880. As processor 102 executes code sequence 900, it may begin with instructions 902. Here, processor 102 may first determine whether the stack pointer % sp is pointing to the boot stack 226 or to the OS stack 230 (thereby determining whether "boot-function-n" 401/the "preserveContext" function are being called from the boot loader application 208 or whether "boot-function-n" 401/the "preserveContext" function are being called from the OS application 210). Processor 102 may make this determination by copying the value in the stack pointer register % sp to register % d0 and then determining whether this value is within the boot RAM 222 by, for example, comparing it to the "End-of-Boot-RAM" as shown here (one will recognize this determination may be made in other fashions, such as determining whether the value of the stack pointer is within the OS RAM 224, for example). If the value is within the boot RAM 222, processor 102 may branch to instructions 910, returning to the caller function with the value saved to register % d0 (here, a value pointing to the boot stack 226). In the alternative, if at instructions 902 the processor 102 determines that the stack pointer is not in the boot RAM 222 and is thus pointing to the OS stack 230, processor 102 may proceed to instructions 904. Here, the processor 102 may determine the start of the boot stack 226 and copy this value into the stack pointer register % sp. Proceeding to instructions 906, processor 102 may next copy scratch register values (here, four values) that were saved to the OS stack 230 to the boot stack 226 as the "preserveContext" function was called, moving the stack pointer register % sp as these copies are made. Proceeding to instructions 908, processor 102 may next copy to the boot stack 226 the next executable instruction that was pushed onto the OS stack 230 as the "preserveContext" function was called. Lastly, processor 102 may proceed to instructions 910, returning to the caller function with the value saved to register % d0 (here, a value pointing to the OS stack 230).

Referring now to FIG. 10, there is shown an example code sequence 1000 that includes an example implementation of the "restoreContext" function 406 as described herein. In this example, % sp, % d0, and % a0 may represent registers of processor 102 with register % sp being the stack pointer register 880. As processor 102 executes code sequence 1000, it may begin with instructions 1002. As shown in FIG. 4 and as discussed above, the "restoreContext" function 406 may be passed as a function parameter the stack pointer value returned by the "preserveContext" function 404. At instructions 1002 processor 102 may copy this value from the stack to register % d0. Next, at instructions 1004 processor 102 may perform an error check and if no error, proceed to instructions 1006 to determine whether the stack pointer parameter value passed to the "restoreContext" function 406 is pointing to the boot stack 226 or to the OS stack 230 (thereby determining whether the "preserveContext" function 404 performed a stack swap). Processor 102 may make this determination by comparing the stack pointer parameter value to the "End-of-Boot-RAM" thereby determining whether the stack pointer parameter value is within the boot RAM 222 (one will recognize this determination may be made in other fashions, such as determining whether the value of the stack pointer is within the OS RAM 224, for example) (Again, one will further recognize that other means may be used to determine whether the "preserveContext" function 404 changed stacks, such as through the use of a flag value (e.g., yes/no) set by the "preserveContext" function 404. One will recognize other examples are possible.). If the value is within the boot RAM 222, processor 102 may branch to instructions 1014, returning to the caller function. In this case, the "preserveContext" function 404 did not perform a stack swap. In the alternative, if at instructions 1004 the processor 102 determines that the stack pointer parameter value passed to the "restoreContext" function 406 is not in the boot RAM 222 and the "preserveContext" function thus made a stack swap, processor 102 may proceed to instructions 1008. Here, the processor 102 may save the current stack pointer value of register % sp (which is pointing to the boot stack 226) and then copy into the stack register % sp the stack pointer parameter value thereby causing the stack pointer to point to the OS stack 230. Proceeding to instructions 1010, processor 102 may next copy to the OS stack 230 scratch register values (in this example four) and function parameters (in this example one) that were saved to the boot stack 226 as the "restoreContext" function 406 was called, moving the stack pointer % sp as these copies are made. Proceeding to instructions 1012, processor 102 may next copy to the OS stack the next executable instruction that was pushed onto the boot stack as "restoreContext" function 406 was called. Lastly, processor 102 may proceed to instructions 1014, returning to the caller function.

One will recognize that while the methods and systems discussed herein are described with respect to a boot stack 226 and an OS stack 230, the methods and systems are applicable to other computing architectures that may use different stack configurations, for example.

In addition to what has been described herein, the methods and systems may also be implemented in a computer program(s), software, or firmware incorporated in one or more computer-readable media for execution by a computer (s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. An apparatus, comprising:
   at least one processor; and
   at least one memory module communicatively coupled to the at least one processor, wherein the at least one memory module has stored thereon software instructions of a first application and of a second application, wherein the second application comprises a first function and a second function, wherein the first application has a first stack associated therewith and the second application has a second stack associated therewith, and wherein the software instructions, when executed by the at least one processor, direct the at least one processor to:
      execute the second application, wherein in executing the second application a stack pointer register points to the second stack; and
      in executing the second application:
         call the first function of the second application, wherein to call the first function comprises to push data values onto the second stack;
         execute the first function, wherein to execute the first function comprises to determine whether the stack pointer register is pointing to the first stack or is pointing to the second stack;
         based at least in part on determining that the stack pointer register is pointing to the second stack, maintain the stack pointer register pointing to the second stack;
         call the second function from the first function; and
         execute the second function using the second stack;
      execute the first application, wherein in executing the first application the stack pointer register points to the first stack;
      in executing the first application, call the first function of the second application, wherein to call the first function comprises to push data values onto the first stack, and wherein the stack pointer register points to the first stack subsequent to pushing the data values onto the first stack;
      execute the first function, wherein to execute the first function comprises to determine whether the stack pointer register is pointing to the first stack or is pointing to the second stack;
      based at least in part on determining that the stack pointer register is pointing to the first stack, change the stack pointer register to point from the first stack to the second stack;
      call the second function from the first function;
      execute the second function using the second stack;
      at completion of the second function, change the stack pointer register to point from the second stack to the first stack;
      return to the first application; and
      continue to execute the first application using the first stack.

2. The apparatus of claim 1, wherein to change the stack pointer register to point from the second stack to the first stack comprises to:
  determine that the stack pointer register was changed to point from the first stack to the second stack prior to executing the second function; and
  based at least in part on determining that the stack pointer register was changed to point from the first stack to the second stack prior to executing the second function, change the stack pointer register to point from the second stack to the first stack.

3. The apparatus of claim 1, wherein the software instructions, when executed by the at least one processor, further direct the at least one processor to:
  subsequent to changing the stack pointer register to point from the first stack to the second stack and prior to calling the second function, copy to the second stack from the first stack first data values located on the first stack; and
  subsequent to changing the stack pointer register to point from the second stack to the first stack, copy to the first stack from the second stack second data values located on the second stack.

4. The apparatus of claim 3, wherein to copy to the second stack from the first stack first data values located on the first stack comprises to copy to the second stack from the first stack an address of an instruction to be executed by the at least one processor.

5. The apparatus of claim 4, wherein to copy to the second stack from the first stack first data values located on the first stack further comprises to copy to the second stack from the first stack scratch register values that were saved to the first stack.

6. The apparatus of claim 5, wherein to copy to the first stack from the second stack second data values located on the second stack comprises to copy to the first stack from the second stack another address of an instruction to be executed by the at least one processor, and scratch register values that were saved to the second stack.

7. The apparatus of claim 1, wherein the software instructions, when executed by the at least one processor, further direct the at least one processor to:
  prior to changing the stack pointer register to point from the first stack to the second stack, configure the at least one processor not to allow a process or thread swap until changing the stack pointer register to point from the second stack to the first stack.

8. The apparatus of claim 1, wherein to execute the second function subsequent to changing the stack pointer register to point from the first stack to the second stack further comprises to:
  receive via a network interface controller a third application;
  store the third application in the at least one memory module; and
  overwrite within the at least one memory module the first application with the third application.

9. The apparatus of claim 1,
  wherein the second application further comprises a third function and a fourth function; and
  wherein to execute the first function when called from the first application further comprises to:
    call the third function from the first function and execute the third function, wherein the third function changes the stack pointer register to point from the first stack to the second stack; and
    call the fourth function from the first function and execute the fourth function, wherein the fourth function changes the stack pointer register to point from the second stack to the first stack; and
  wherein the first function calls the third function prior to calling the second function, and calls the fourth function after executing the second function.

10. The apparatus of claim 1, wherein the first application, and the first function and the second function when called from the first application, execute under one process or one thread.

11. A method executed by at least one processor, wherein the at least one processor is communicatively coupled to at least one memory module that has stored thereon software instructions of a first application and software instructions of a second application, wherein the second application comprises a first function and a second function, and wherein the first application has a first stack associated therewith and the second application has a second stack associated therewith, the method comprising:
  executing by the at least one processor the second application, wherein in executing the second application a stack pointer register points to the second stack; and
  in executing the second application:
    calling by the at least one processor the first function of the second application, wherein calling the first function comprises pushing data values onto the second stack;
    executing by the at least one processor the first function, wherein executing the first function comprises determining whether the stack pointer register is pointing to the first stack or is pointing to the second stack;
    based at least in part on determining that the stack pointer register is pointing to the second stack, maintaining by the at least one processor the stack pointer register pointing to the second stack;
    calling by the at least one processor the second function from the first function; and
    executing by the at least one processor the second function using the second stack;
  executing by the at least one processor the first application, wherein in executing the first application the stack pointer register points to the first stack;
  in executing the first application, calling by the at least one processor the first function of the second application, wherein calling the first function comprises pushing data values onto the first stack, and wherein the stack pointer register points to the first stack subsequent to pushing the data values onto the first stack;
  executing by the at least one processor the first function, wherein executing the first function comprises determining whether the stack pointer register is pointing to the first stack or is pointing to the second stack;
  based at least in part on determining that the stack pointer register is pointing to the first stack, changing by the at least one processor the stack pointer register to point from the first stack to the second stack;
  calling by the at least one processor the second function from the first function;
  executing by the at least one processor the second function using the second stack;
  at completion of the second function, changing by the at least one processor the stack pointer register to point from the second stack to the first stack;
  returning by the at least one processor to the first application; and continuing to execute by the at least one processor the first application using the first stack.

12. The method of claim 11, wherein changing the stack pointer register to point from the second stack to the first stack comprises:
    determining by the at least one processor that the stack pointer register was changed to point from the first stack to the second stack prior to executing the second function; and
    based at least in part on determining that the stack pointer register was changed to point from the first stack to the second stack prior to executing the second function, changing the stack pointer register to point from the second stack to the first stack.

13. The method of claim 11, further comprising:
    subsequent to changing the stack pointer register to point from the first stack to the second stack and prior to calling the second function, copying by the at least one processor to the second stack from the first stack first data values located on the first stack; and
    subsequent to changing the stack pointer register to point from the second stack to the first stack, copying by the at least one processor to the first stack from the second stack second data values located on the second stack.

14. The method of claim 13, wherein copying to the second stack from the first stack first data values located on the first stack comprises copying to the second stack from the first stack an address of an instruction to be executed by the at least one processor.

15. The method of claim 14, wherein copying to the second stack from the first stack first data values located on the first stack further comprises copying to the second stack from the first stack scratch register values that were saved to the first stack.

16. The method of claim 15, wherein copying to the first stack from the second stack second data values located on the second stack comprises copying to the first stack from the second stack another address of an instruction to be executed by the at least one processor, and scratch register values that were saved to the second stack.

17. The method of claim 11, further comprising:
    prior to changing the stack pointer register to point from the first stack to the second stack, configuring the at least one processor not to allow a process or thread swap until changing the stack pointer register to point from the second stack to the first stack.

18. The method of claim 11, wherein executing the second function subsequent to changing the stack pointer register to point from the first stack to the second stack further comprises:
    receiving by the at least one processor via a network interface controller a third application;
    storing by the at least one processor the third application in the at least one memory module; and
    overwriting by the at least one processor within the at least one memory module the first application with the third application.

19. The method of claim 11,
    wherein the second application further comprises a third function and a fourth function; and
    wherein executing the first function when called from the first application further comprises:
        calling by the at least one processor the third function from the first function and executing by the at least one processor the third function, wherein the third function changes the stack pointer register to point from the first stack to the second stack; and
        calling by the at least one processor the fourth function from the first function and executing by the at least one processor the fourth function, wherein the fourth function changes the stack pointer register to point from the second stack to the first stack; and
    wherein the first function calls the third function prior to calling the second function, and calls the fourth function after executing the second function.

20. The method of claim 11, wherein the first application, and the first function and the second function when called from the first application, execute under one process or one thread.

21. A tangible non-transitory computer readable medium having software instructions of a first application and of a second application stored thereon, wherein the second application comprises a first function and a second function, wherein the first application has a first stack associated therewith and the second application has a second stack associated therewith, and wherein the software instructions, when executed by the at least one processor, direct the at least one processor to:
    execute the second application, wherein in executing the second application a stack pointer register points to the second stack; and
    in executing the second application:
        call the first function of the second application, wherein to call the first function comprises to push data values onto the second stack;
        execute the first function, wherein to execute the first function comprises to determine whether the stack pointer register is pointing to the first stack or is pointing to the second stack;
        based at least in part on determining that the stack pointer register is pointing to the second stack, maintain the stack pointer register pointing to the second stack;
        call the second function from the first function; and
        execute the second function using the second stack;
    execute the first application, wherein in executing the first application the stack pointer register points to the first stack;
    in executing the first application, call the first function of the second application, wherein to call the first function comprises to push data values onto the first stack, and wherein the stack pointer register points to the first stack subsequent to pushing the data values onto the first stack;
    execute the first function, wherein to execute the first function comprises to determine whether the stack pointer register is pointing to the first stack or is pointing to the second stack;
    based at least in part on determining that the stack pointer register is pointing to the first stack, change the stack pointer register to point from the first stack to the second stack;
    call the second function from the first function;
    execute the second function using the second stack;
    at completion of the second function, change the stack pointer register to point from the second stack to the first stack;
    return to the first application; and
    continue to execute the first application using the first stack.

22. The tangible non-transitory computer readable medium of claim 21, wherein to change the stack pointer register to point from the second stack to the first stack comprises to:

determine that the stack pointer register was changed to point from the first stack to the second stack prior to executing the second function; and based at least in part on determining that the stack pointer register was changed to point from the first stack to the second stack prior to executing the second function, change the stack pointer register to point from the second stack to the first stack.

23. The tangible non-transitory computer readable medium of claim 21, wherein the software instructions, when executed by the at least one processor, further direct the at least one processor to:

subsequent to changing the stack pointer register to point from the first stack to the second stack and prior to calling the second function, copy to the second stack from the first stack first data values located on the first stack; and subsequent to changing the stack pointer register to point from the second stack to the first stack, copy to the first stack from the second stack second data values located on the second stack.

24. The tangible non-transitory computer readable medium of claim 23, wherein to copy to the second stack from the first stack first data values located on the first stack comprises to copy to the second stack from the first stack an address of an instruction to be executed by the at least one processor.

25. The tangible non-transitory computer readable medium of claim 24, wherein to copy to the second stack from the first stack first data values located on the first stack further comprises to copy to the second stack from the first stack scratch register values that were saved to the first stack.

26. The tangible non-transitory computer readable medium of claim 25, wherein to copy to the first stack from the second stack second data values located on the second stack comprises to copy to the first stack from the second stack another address of an instruction to be executed by the at least one processor, and scratch register values that were saved to the second stack.

27. The tangible non-transitory computer readable medium of claim 21, wherein the software instructions, when executed by the at least one processor, further direct the at least one processor to:

prior to changing the stack pointer register to point from the first stack to the second stack, configure the at least one processor not to allow a process or thread swap until changing the stack pointer register to point from the second stack to the first stack.

28. The tangible non-transitory computer readable medium of claim 21, wherein to execute the second function subsequent to changing the stack pointer register to point from the first stack to the second stack further comprises to:

receive via a network interface controller a third application;

store the third application in the at least one memory module; and overwrite within the at least one memory module the first application with the third application.

29. The tangible non-transitory computer readable medium of claim 21, wherein the second application further comprises a third function and a fourth function; and wherein to execute the first function when called from the first application further comprises to:

call the third function from the first function and execute the third function, wherein the third function changes the stack pointer register to point from the first stack to the second stack; and call the fourth function from the first function and execute the fourth function, wherein the fourth function changes the stack pointer register to point from the second stack to the first stack; and wherein the first function calls the third function prior to calling the second function, and calls the fourth function after executing the second function.

30. The tangible non-transitory computer readable medium of claim 21, wherein the first application, and the first function and the second function when called from the first application, execute under one process or one thread.

31. An apparatus comprising:

at least one processor; and at least one memory module communicatively coupled to the at least one processor, wherein the at least one memory module has stored thereon software instructions of a first application and of a second application that when executed by the at least one processor direct the at least one processor to:

execute the second application; and in executing the second application:

call a first function of the second application, wherein to call the first function comprises to push data values onto a second stack, and wherein a stack pointer register points to the second stack subsequent to pushing the data values onto the second stack;

in executing the first function, maintain the stack pointer register pointing to the second stack;

call a second function of the second application; and execute the second function using the second stack;

execute the first application;

in executing the first application, call the first function of the second application, wherein to call the first function comprises to push data values onto a first stack, and wherein the stack pointer register points to the first stack subsequent to pushing the data values onto the first stack;

in executing the first function, change the stack pointer register to point from the first stack to the second stack;

copy to the second stack from the first stack first data values located on the first stack;

call the second function of the second application;

execute the second function using the second stack;

at completion of the second function, change the stack pointer register to point from the second stack to the first stack;

copy to the first stack from the second stack second data values located on the second stack;

return to the first application; and continue to execute the first application using the first stack.

32. The apparatus of claim 31, wherein to change the stack pointer register to point from the second stack to the first stack comprises to:

determine that the stack pointer register was changed to point from the first stack to the second stack prior to executing the second function; and based at least in part on determining that the stack pointer register was changed to point from the first stack to the second stack prior to executing the second function, change the stack pointer register to point from the second stack to the first stack.

33. The apparatus of claim 31, wherein to copy to the second stack from the first stack first data values located on the first stack comprises to copy to the second stack from the first stack an address of an instruction to be executed by the at least one processor.

34. The apparatus of claim 33, wherein to copy to the second stack from the first stack first data values located on the first stack further comprises to copy to the second stack from the first stack scratch register values that were saved to the first stack.

35. The apparatus of claim 34, wherein to copy to the first stack from the second stack second data values located on the second stack comprises to copy to the first stack from the second stack another address of an instruction to be executed by the at least one processor, and scratch register values that were saved to the second stack.

36. The apparatus of claim 31, wherein the software instructions, when executed by the at least one processor, further direct the at least one processor to:
prior to changing the stack pointer register to point from the first stack to the second stack, configure the at least one processor not to allow a process or thread swap until changing the stack pointer register to point from the second stack to the first stack.

37. The apparatus of claim 31, wherein to execute the second function subsequent to changing the stack pointer register to point from the first stack to the second stack further comprises to:
receive via a network interface controller a third application;
store the third application in the at least one memory module; and
overwrite within the at least one memory module the first application with the third application.

38. The apparatus of claim 31,
wherein the second application further comprises a third function and a fourth function; and
wherein to execute the first function when called from the first application further comprises to:
call the third function from the first function and execute the third function, wherein the third function changes the stack pointer register to point from the first stack to the second stack; and
call the fourth function from the first function and execute the fourth function, wherein the fourth function changes the stack pointer register to point from the second stack to the first stack; and
wherein the first function calls the third function prior to calling the second function, and calls the fourth function after executing the second function.

* * * * *